(12) United States Patent
Ashwathappa et al.

(10) Patent No.: US 12,335,579 B2
(45) Date of Patent: Jun. 17, 2025

(54) CLOUD GAMING BENCHMARK TESTING

(71) Applicant: Spirent Communications, Inc., San Jose, CA (US)

(72) Inventors: Mithun Ashwathappa, Sykesville, MD (US); Michael Colligan, Sunnyvale, CA (US)

(73) Assignee: Spirent Communications, Inc., Santa Clara, CA (US)

( * ) Notice: Subject to any disclaimer, the term of this patent is extended or adjusted under 35 U.S.C. 154(b) by 142 days.

(21) Appl. No.: 18/227,885

(22) Filed: Jul. 28, 2023

(65) Prior Publication Data

US 2023/0379551 A1 Nov. 23, 2023

Related U.S. Application Data

(60) Continuation-in-part of application No. 17/878,813, filed on Aug. 1, 2022, now Pat. No. 12,192,591, (Continued)

(51) Int. Cl.
*H04N 21/647* (2011.01)
*H04N 21/234* (2011.01)

(52) U.S. Cl.
CPC . *H04N 21/64738* (2013.01); *H04N 21/23418* (2013.01); *H04N 21/64784* (2013.01)

(58) Field of Classification Search
CPC ....... H04N 21/64738; H04N 21/23418; H04N 21/64784
See application file for complete search history.

(56) References Cited

U.S. PATENT DOCUMENTS 4,991,007 A 2/1991 Corley
5,181,098 A 1/1993 Guerin et al.
(Continued)

FOREIGN PATENT DOCUMENTS

CN 108090902 A 5/2018

OTHER PUBLICATIONS

Series G: Transmission Systems and Media, Digital Systems and Networks Multimedia Quality of Service and performance—Generic and user-related aspects (ITU-T, G.1022), International Telecommunication Union, Jul. 2016, 34 pages.
(Continued)

*Primary Examiner* — Kyu Chae
(74) *Attorney, Agent, or Firm* — Haynes Beffel & Wolfeld LLP; Ernest J Beffel, Jr.; Jason Liao

(57) ABSTRACT

The technology disclosed teaches a method of testing performance of a device-under-test during cloud gaming over a live cellular network. The method comprises instrumenting the device-under-test with at least one instrument app that interacts with a browser on the device-under-test and captures performance metrics from gaming network traffic. The browser and the instrument app can be invoked using a test controller separated from the device-under-test, causing the browser to connect to a gaming simulation over the live cellular network. A segmented gaming image stream is transmitted to the browser, with segmented playing at varying bit rates and image complexity while the instrument app causes the browser to transmit artificial gameplay events to a gaming simulation test server. Performance metrics from the gaming network traffic are captured, as well as gaming images rendered by the browser during the segmented gaming image stream.

18 Claims, 16 Drawing Sheets
(7 of 16 Drawing Sheet(s) Filed in Color)

Related U.S. Application Data which is a division of application No. 16/842,676, filed on Apr. 7, 2020, now Pat. No. 11,405,695.

(60) Provisional application No. 62/831,114, filed on Apr. 8, 2019, provisional application No. 63/393,695, filed on Jul. 29, 2022.

(56) References Cited

U.S. PATENT DOCUMENTS

| | | | |
|---|---|---|---|
| 5,351,201 | A | 9/1994 | Harshbarger, Jr. et al. |
| 6,542,185 | B1 | 4/2003 | Bogardus |
| 9,380,297 | B1 | 6/2016 | Djurdjevic |
| 9,591,300 | B2 | 3/2017 | Djurdjevic |
| 2004/0066454 | A1 | 4/2004 | Otani et al. |
| 2004/0085256 | A1 | 5/2004 | Hereld et al. |
| 2005/0020357 | A1 | 1/2005 | Oe |
| 2007/0091201 | A1 | 4/2007 | Sasaki |
| 2007/0091334 | A1 | 4/2007 | Yamaguchi et al. |
| 2007/0217448 | A1* | 9/2007 | Luo .................. H04L 47/283 370/468 |
| 2010/0157047 | A1 | 6/2010 | Larkin et al. |
| 2010/0309231 | A1 | 12/2010 | Stauder et al. |
| 2011/0102602 | A1 | 5/2011 | Leventu et al. |
| 2013/0027568 | A1 | 1/2013 | Zou et al. |
| 2013/0057705 | A1* | 3/2013 | Parker .............. H04N 21/64723 348/184 |
| 2013/0293725 | A1 | 11/2013 | Zhang et al. |
| 2013/0305106 | A1 | 11/2013 | Mittal et al. |
| 2014/0176730 | A1 | 6/2014 | Kaji et al. |
| 2015/0135209 | A1 | 5/2015 | LaBosco et al. |
| 2015/0279037 | A1 | 10/2015 | Griffin et al. |
| 2015/0365725 | A1 | 12/2015 | Belyaev et al. |
| 2016/0165225 | A1 | 6/2016 | Djurdjevic |
| 2016/0165226 | A1 | 6/2016 | Djurdjevic |
| 2016/0353138 | A1 | 12/2016 | Bennington |
| 2016/0358321 | A1 | 12/2016 | Xu et al. |
| 2019/0138938 | A1* | 5/2019 | Vasseur ............. H04L 43/0888 |
| 2019/0334824 | A1* | 10/2019 | Jana .................. H04L 67/02 |
| 2021/0146240 | A1* | 5/2021 | Colenbrander ....... A63F 13/335 |
| 2023/0318980 | A1* | 10/2023 | Wei .................. A63F 13/358 709/219 |

OTHER PUBLICATIONS

Series P: Telephone Transmission Quality, Telephone Installations, Local Line Networks Models and tools for quality assessment of streamed media (ITU-T, P.1203). International Telecommunication Union, Oct. 2017, 22 pages.

Per-Title Encode Optimization, Netflix Technology Blog, Dec. 14, 2015, 21 pages (downloaded from https://medium.com/netflix-techblog/per-title-encode-optimization-7e99442b62a2, Jan. 29, 2019.

Kayargadde et al., "Perceptual characterization of images degraded by blur and noise: model", Institute for Perception Research, P.O. Box 513, 5600 MB Eindhoven, The Netherlands, Journal of the Optical Society of America A, vol. 13, No. 6, Jun. 6, 1996, pp. 1178-1188.

Seshadrinathan, et al., "A Subjective Study to Evaluate Video Quality Assessment Algorithms", Intel Corporation, Chandler, AZ—USA. The University of Texas at Austin, TX—USA., Jan. 1, 2010, 10 pages.

Farias, et al., "Perceptual Contributions of Blocky, Blurry, and Fuzzy Impairments to Overall Annoyance", Proceedings of SPIE, vol. 5292, Department of Electrical and Computer Engineering, Department of Psychology, JCSB, Santa Barbara, CA 94106 USA, Jun. 2004, pp. 109-120.

Xu, "Video Telephony for End-consumers: Measurement Stufy of Google+, iChat, and Skype," Networking, IEEE/ACM Transactions, vol. 22, Iss.3, 2014, pp. 17.

Castaner, "Why We Didn't Implement Mean Opinion Score (MOS) in Avalanche Adaptive Bitrate," Spirent Blogs, Nov. 30, 2012, pp. 5.

"8100 Mobile Device Test System UMTS Video User Expereince Module," Spirent Communications Inspired Innovation, Rev. A 07/08, 2008, pp. 2.

Videoconferencing (VC), accessed Mar. 19, 2015, <http://en.wikipedia.org/wiki/Videoconferencing> pp. 4.

H. Schulzrinne, et al., "RTP: A Transport Protocol for Real-Time Applications," RFC 11889, (2015), pp. 150.

"Opinion model predicting gaming quality of experience for cloud gaming services", Series G: Transmission Systems and Media, Digital Systems and Networks Multimedia Quality of Service and performance—Generic and user-related aspects (ITU-T, G.1072), International Telecommunication Union, Jan. 2020, 20 pages.

"Opinion model for network planning of video and audio streaming applications", Series G: Transmission Systems and Media, Digital Systems and Networks Multimedia Quality of Service and performance—Generic and user-related aspects (ITU-T, G.1071), International Telecommunication Union, Nov. 2016, 42 pages.

Andrea Di Domenico et al., "A Network Analysis on Cloud Gaming—Stadia: GeForce Now and PSNow", MDPI Network (2021). DOI: https://doi.org/10.3390/network1030015.

Farias, et al., "Perceptual Contributions of Blocky, Blurry, and Fuzzy Impairments to Overall Annoyance", Proceedings of SPIE, vol. 5292, Department of Electrical and Computer Engineering, Department of Psychology, UCSB, Santa Barbara, CA 94106 USA, Jun. 2004, pp. 109-120.

U.S. Appl. No. 16/842,676, filed Dec. 11, 2018, U.S. Pat. No. 11,216,698, Jan. 4, 2022, Granted.

U.S. Appl. No. 14/667,557, filed Mar. 24, 2015, U.S. Pat. No. 9,591,300, Mar. 7, 2017, Granted.

U.S. Appl. No. 14/667,540, filed Mar. 24, 2015, U.S. Pat. No. 9,380,297, Jun. 28, 2016, Granted.

* cited by examiner

Mobile Gaming QoE testing in the live network.

CLOUD GAMING BENCHMARK TESTING

CROSS-REFERENCE

This application is a continuation-in-part of U.S. patent application Ser. No. 17/878,813, titled "Training an Encrypted Video Stream Network Scoring System With Non-Reference Video Scores", filed Aug. 1, 2022, now U.S. Pat. No. 12,192,591 issued 7 Jan. 2025, which is a divisional of U.S. patent application Ser. No. 16/842,676, titled "Training an Encrypted Video Stream Network Scoring System With Non-Reference Video Scores", filed Apr. 7, 2020, now U.S. Pat. No. 11,405,695, issued Aug. 2, 2022, which claims the benefit of U.S. Provisional Patent Application No. 62/831,114, titled "Training an Encrypted Video Stream Network Scoring System With Non-Reference Video Scores", filed Apr. 8, 2019, which are hereby incorporated by reference for all purposes.

This application also claims the benefit of U.S. Provisional Patent Application No. 63/393,695, titled "Cloud Gaming Benchmark Testing", filed Jul. 29, 2022, which is hereby incorporated by reference for all purposes.

RELATED APPLICATIONS

This application is related to U.S. Non-Provisional patent application Ser. No. 16/216,699, titled "Training a Non-Reference Video Scoring System With Full Reference Video Scores", filed Dec. 11, 2018, now U.S. Pat. No. 11,216,698, issued Jan. 4, 2022 which claims the benefit of U.S. Provisional Patent Application No. 62/710,458, titled "Training a Non-Reference Video Scoring System With Full Reference Video Scores", filed Feb. 16, 2018, which are hereby incorporated by reference for all purposes.

FIELD OF THE TECHNOLOGY DISCLOSED

The technology disclosed applies to the field of cloud gaming, particularly to testing of cellular networks and mobile devices. We describe testing using both upstream and downstream data corresponding to cloud gaming images and user input. Segmented tests are described. Evaluation of collected data including evaluation of rendered gaming video images to produce mean opinion scores is described. Improvements on the International Telecommunication Union—Telecommunication Standardization Sector (ITU-T) G.1072 are described.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The color drawings also may be available in PAIR via the Supplemental Content tab.

Figure 1:
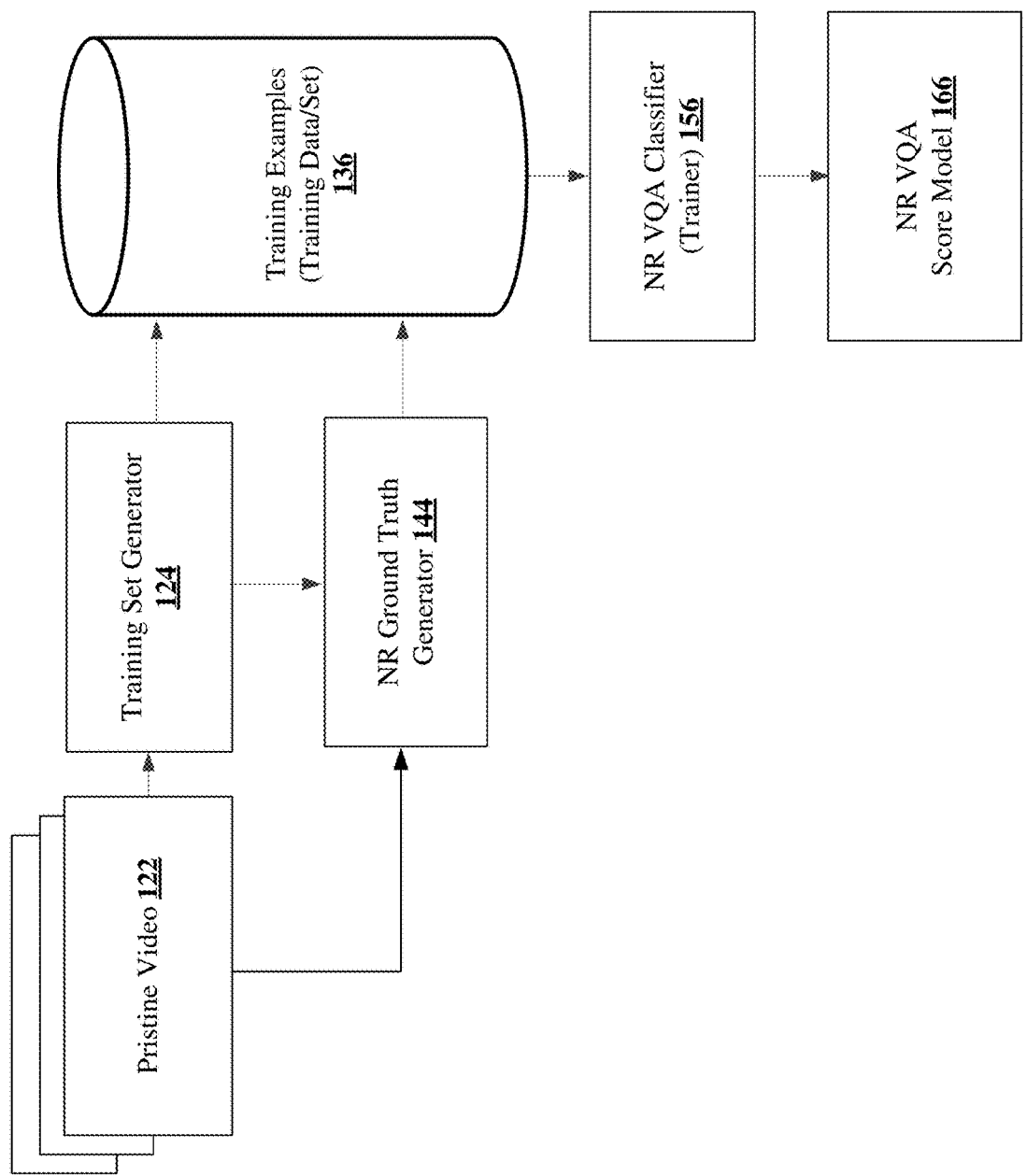

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 1 depicts example architecture for generating NR training data using full reference (FR) video and FR video mean opinion score (VMOS), at a variety of frame rates, image resolutions and delivery bandwidths for game images with varying image complexity.

Figure 2:
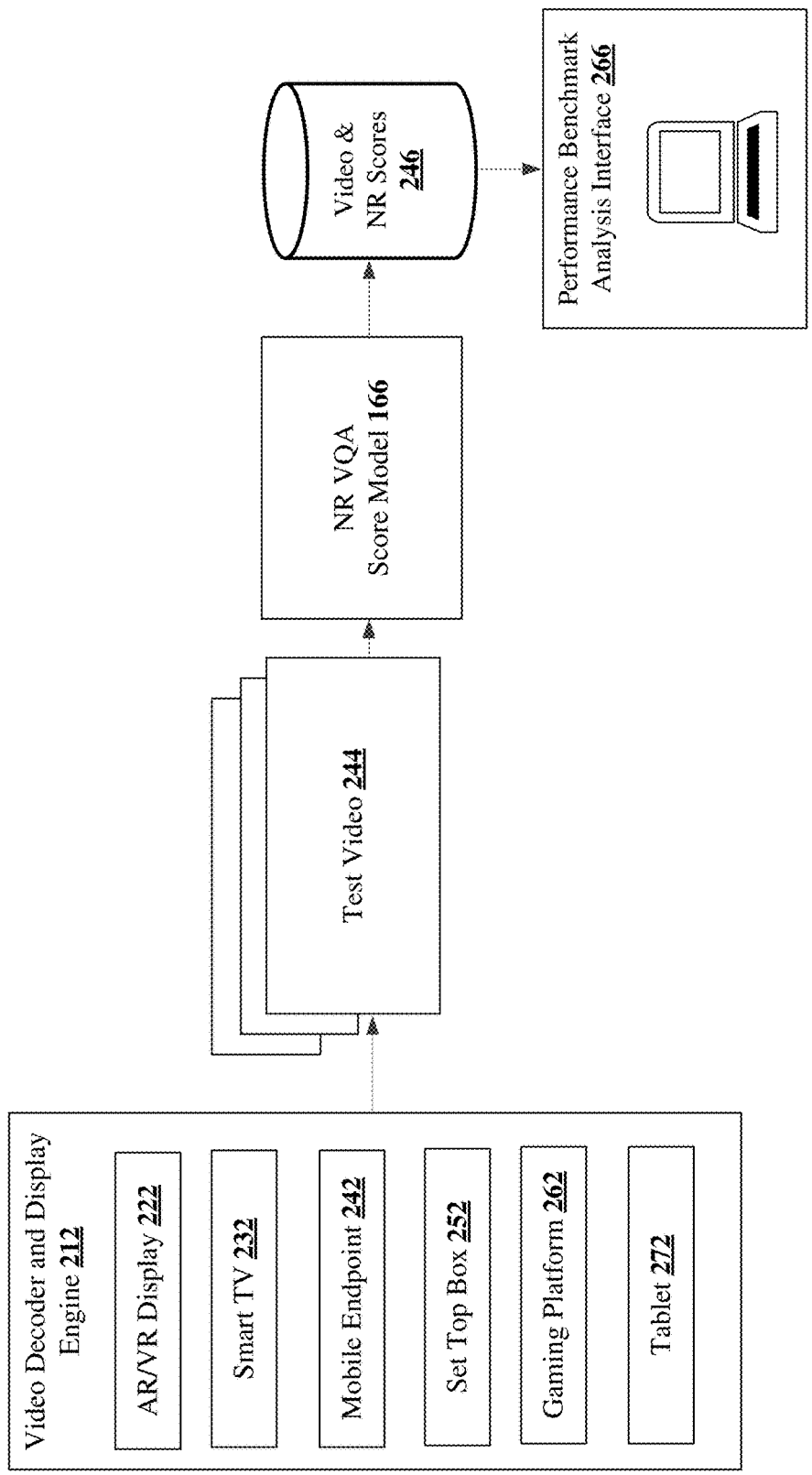

FIG. 2 depicts example test architecture for performing NR VQA on test gaming image video sequences, for which access to pristine full reference video is not available for comparison.

Figure 3:
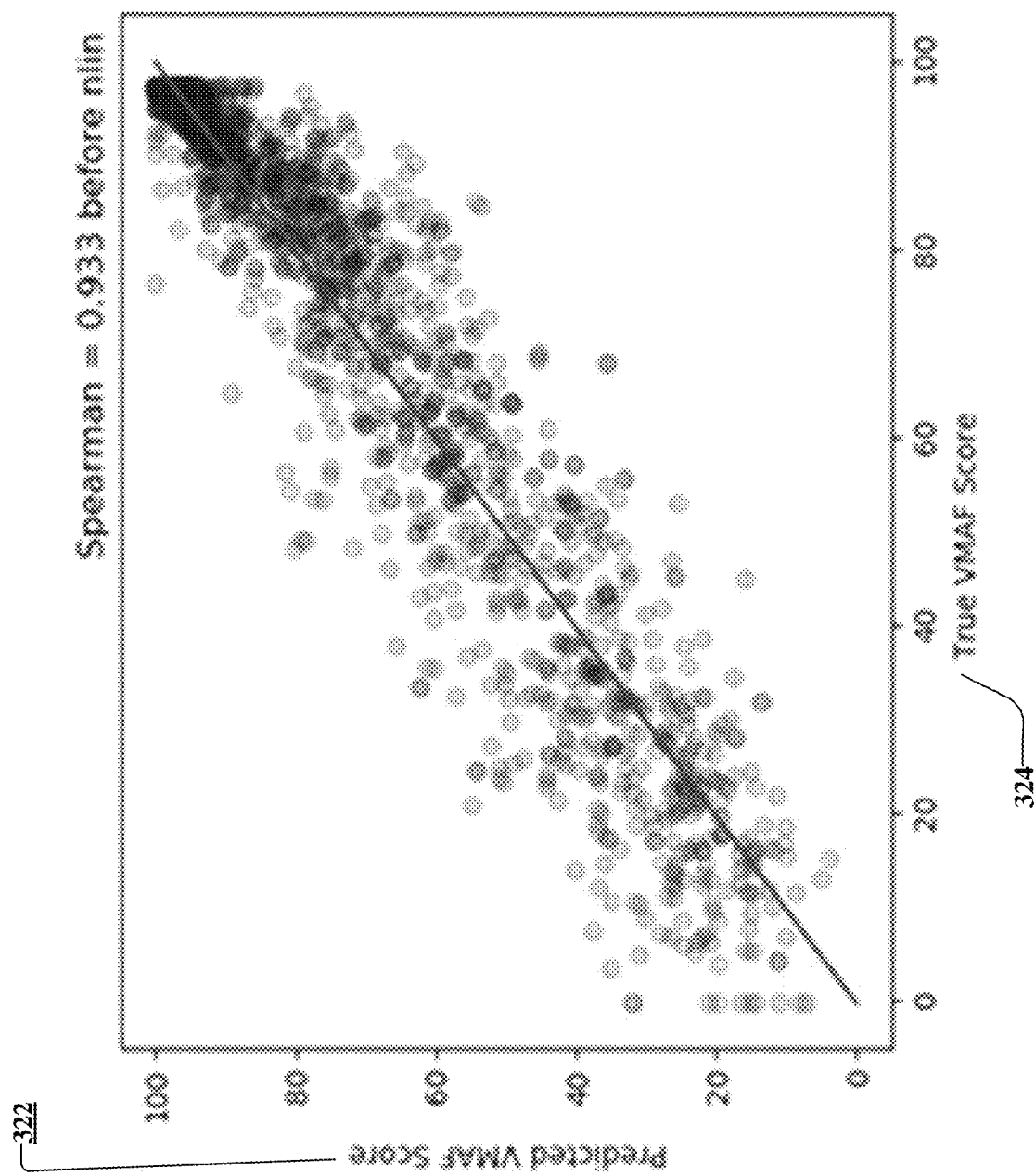

FIG. 3 shows a Spearman correlation graph of true VMAF score and predicted VMAF score obtained using the disclosed technology for training machine learning models to produce no-reference NR VMOS scoring.

Figure 4:
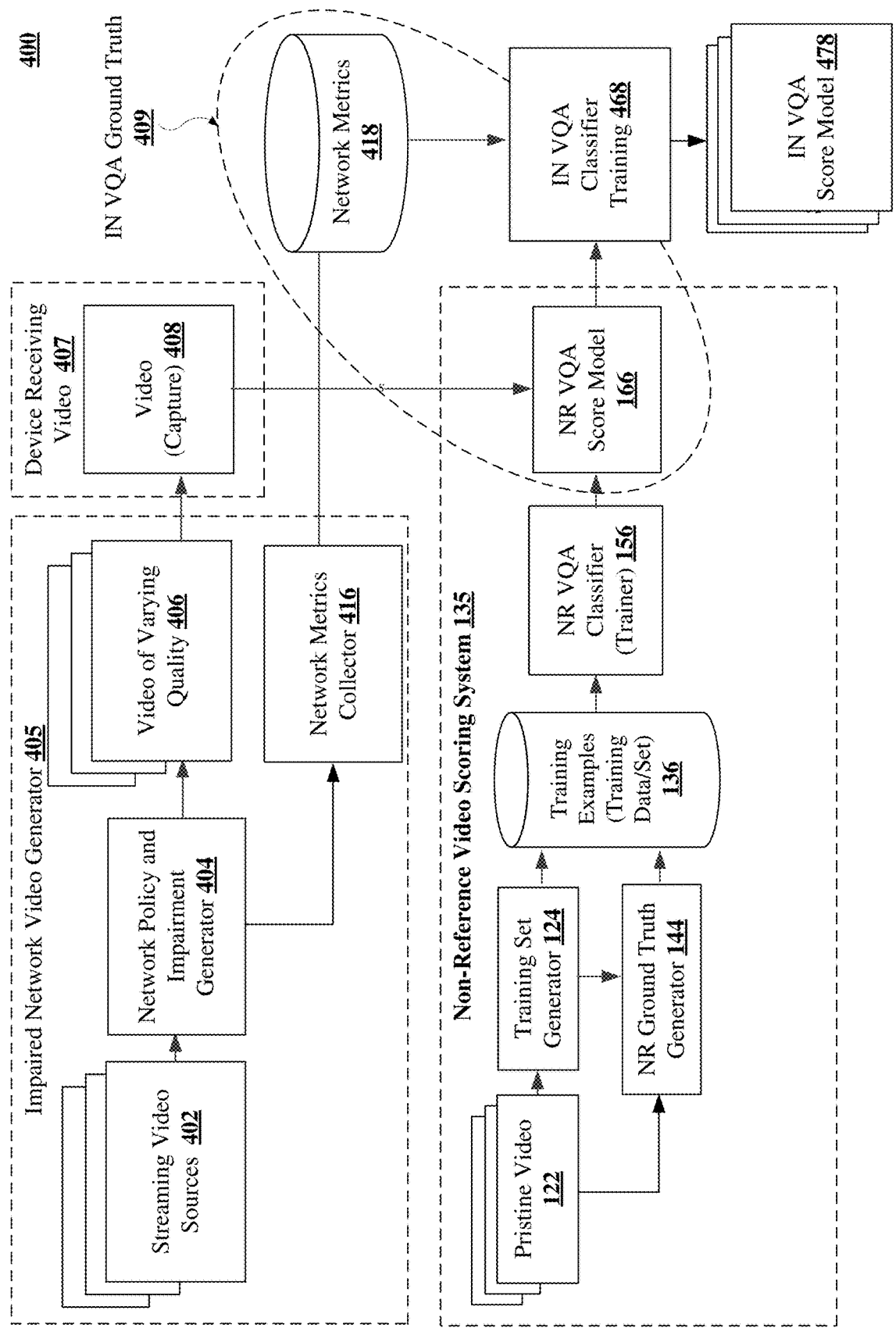

FIG. 4 builds on the example architecture of FIG. 1, using a trained NR VQA to score video from gaming video image sources, such as Stadia™.

Figure 5:
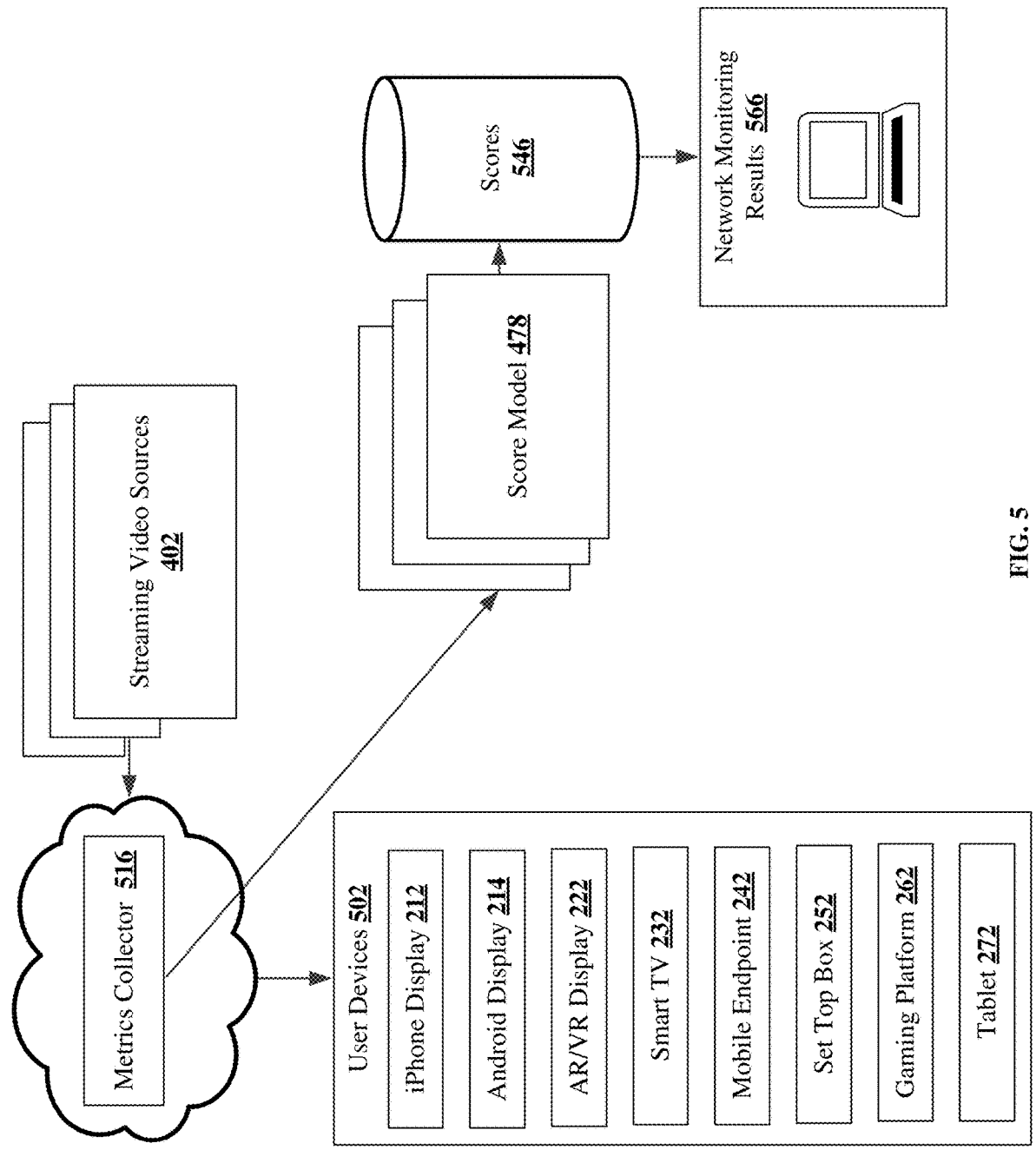

FIG. 5 depicts example architecture for collecting supplemental impaired video from a gaming simulation test server over a live network.

Figure 6:
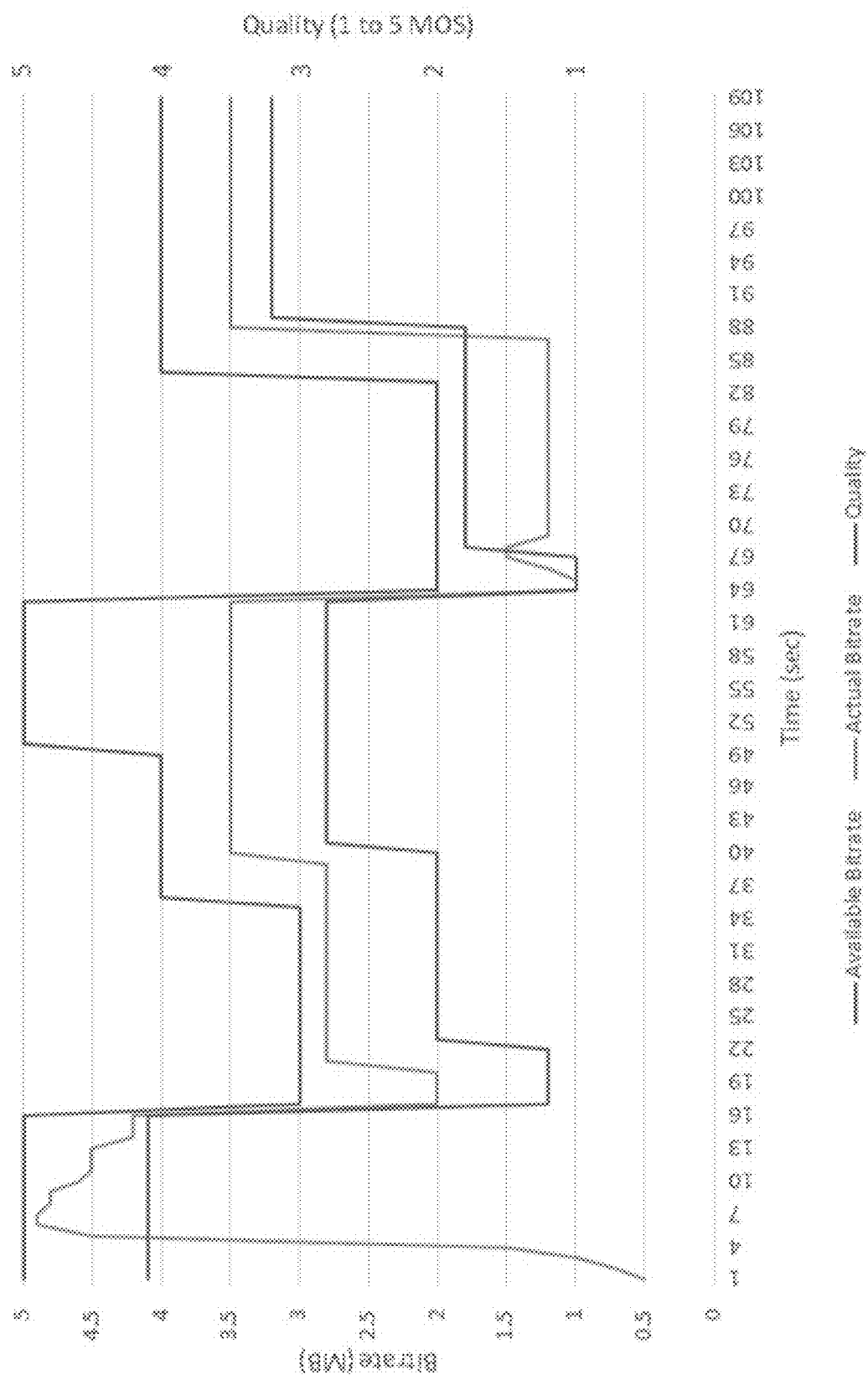

FIG. 6 illustrates potential operation of the impairment generator during creation of supplemental training data.

Figure 7:
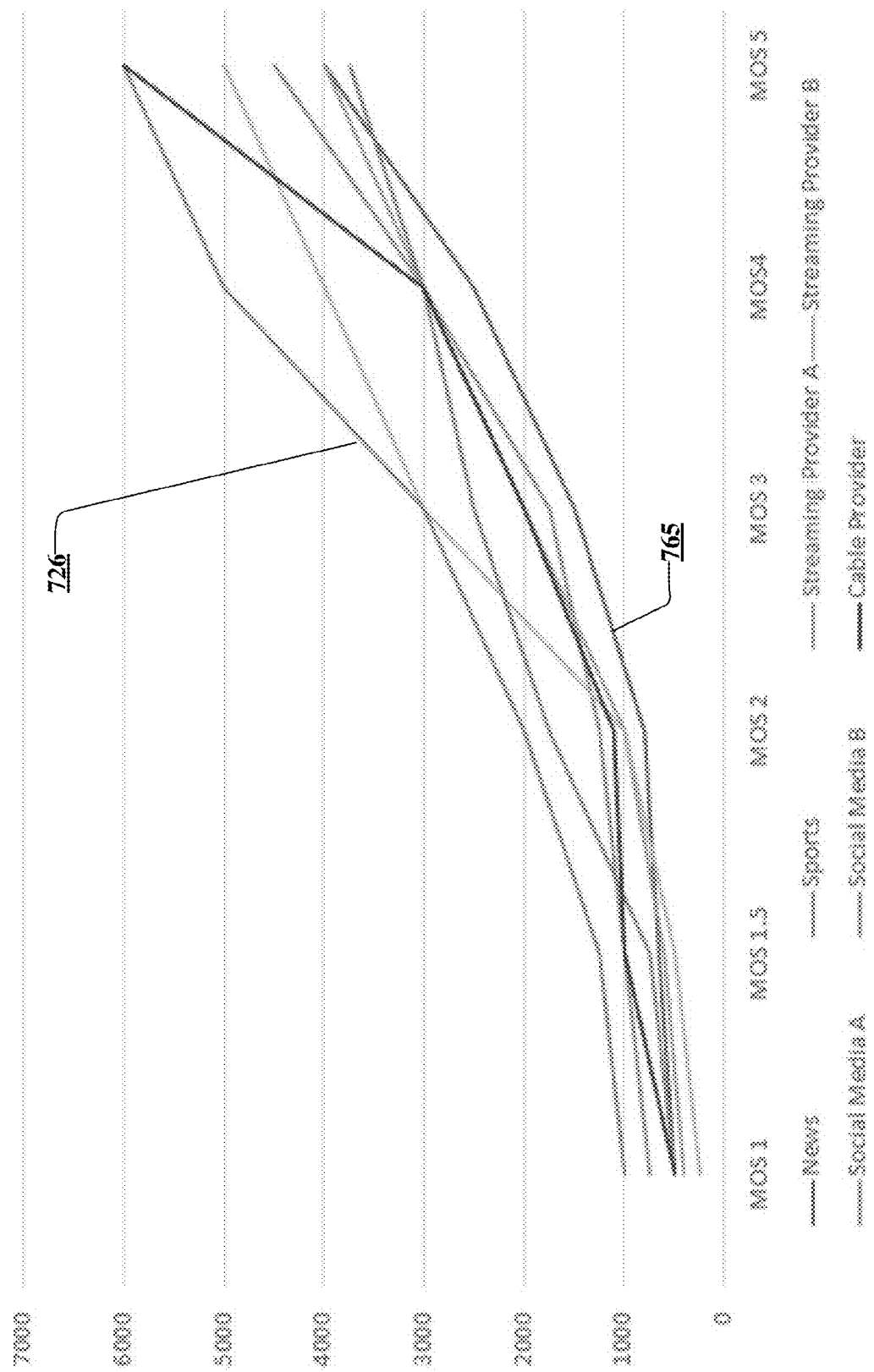

FIG. 7 reports the predicted quality levels across providers, as generated by IN VQA Score Model and displayed via network monitoring results.

Figure 8:

FIG. 8 is an example of a first-person game with realistic graphics that are rated as having HIGH video complexity.

Figure 9:

FIG. 9 is an example of a role-playing game with graphics that are rated as having MEDIUM video complexity.

Figure 10:

FIG. 10 is an example of a simulation game with graphics that are rated as having LOW video complexity.

Figure 11:

FIG. 11 illustrates a cloud gaming test wherein a HIGH video complexity game is displayed containing black bands at the top and bottom of the video with various corresponding metadata.

Figure 12:
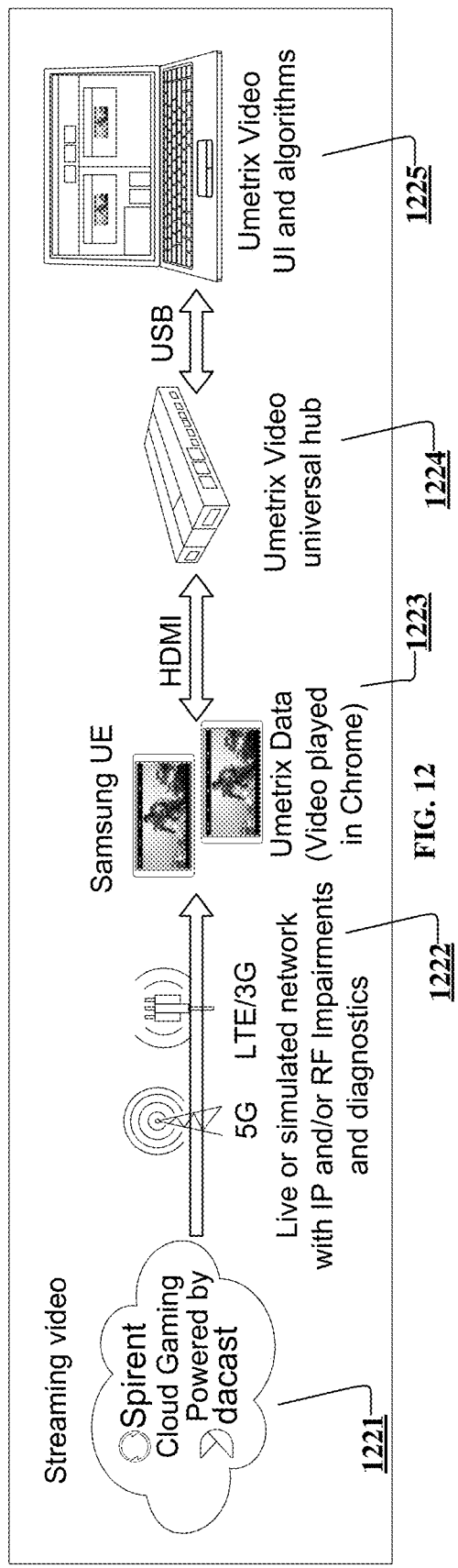

FIG. 12 is a schematic diagram of streaming video from a live or simulated cloud gaming session during a cloud gaming test using a wired connection to obtain images from the game player, in accordance with one implementation of the technology disclosed.

Figure 13:
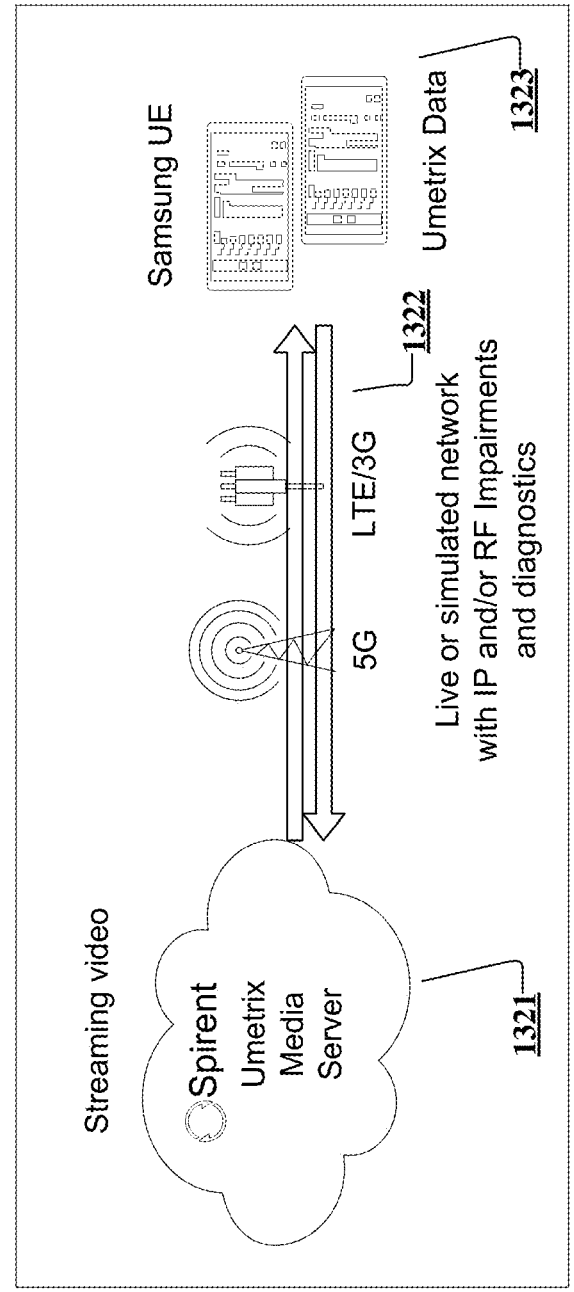

FIG. 13 is a schematic diagram of a cloud gaming test using a wireless connection to obtain test data, in accordance with one implementation of the technology disclosed.

Figure 14:
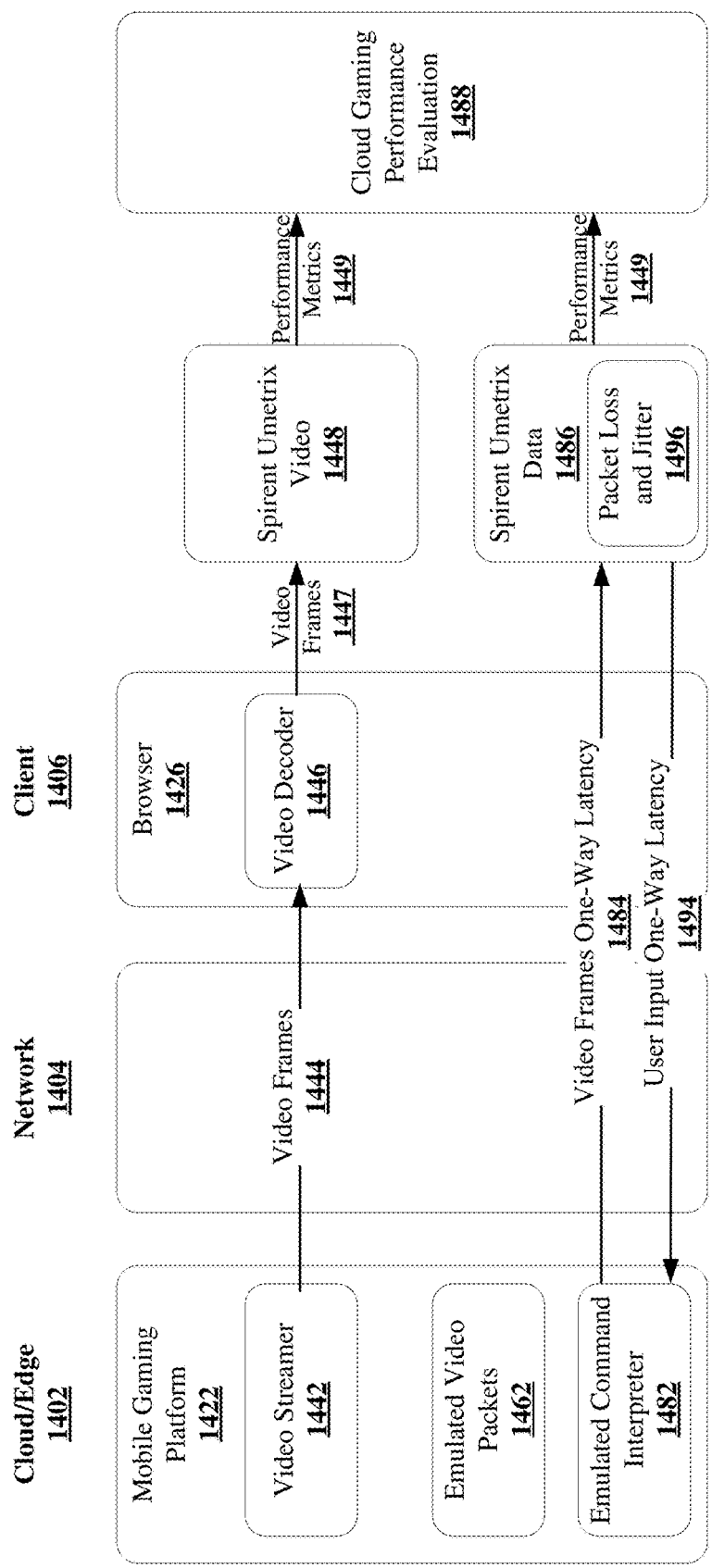

FIG. 14 is a message flow diagram representing a cloud gaming test, in accordance with one implementation the technology disclosed.

Figure 15:
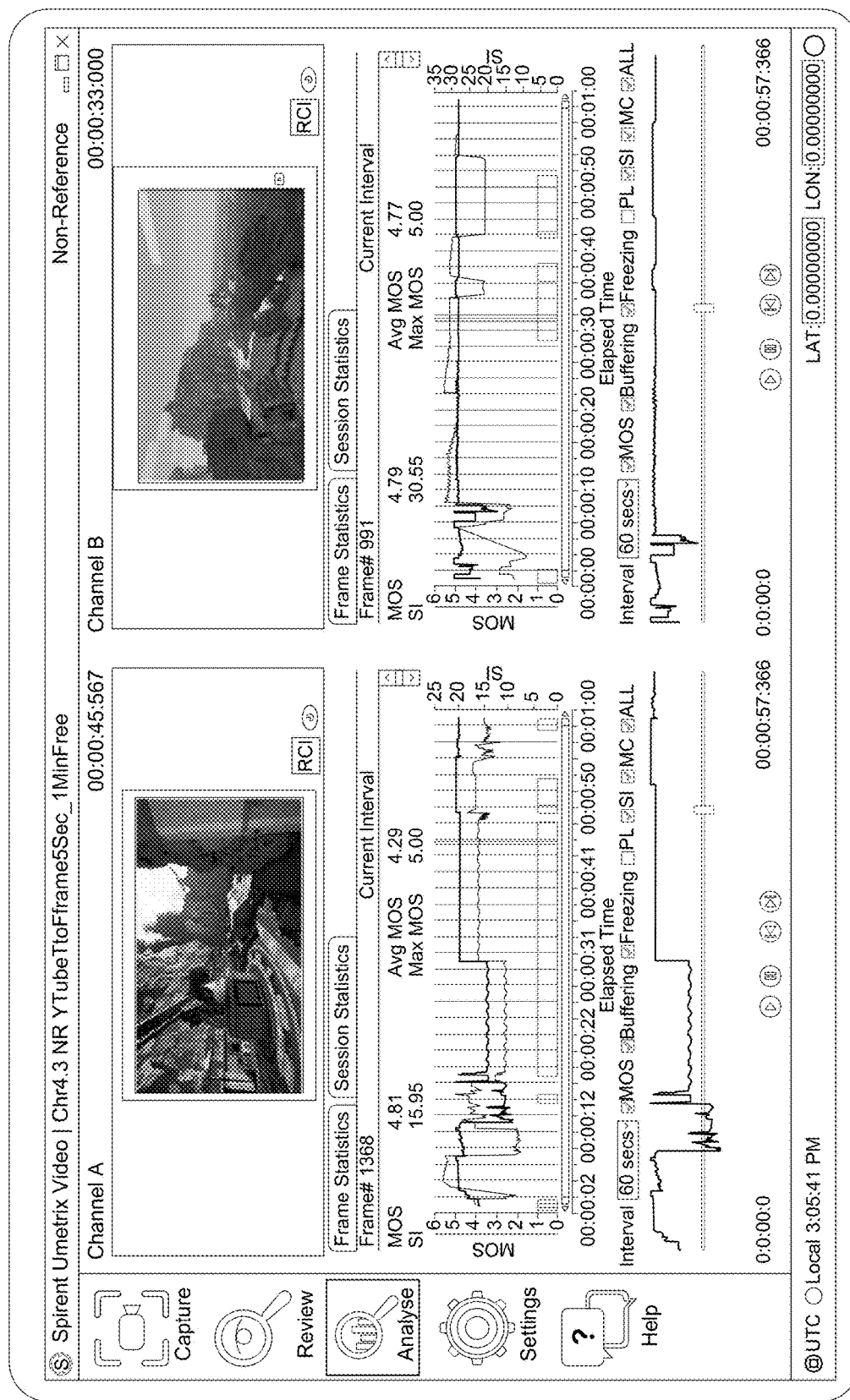

FIG. 15 is a schematic illustrating an example GUI for a cloud gaming test, in accordance with one implementation of the technology disclosed.

Figure 16:
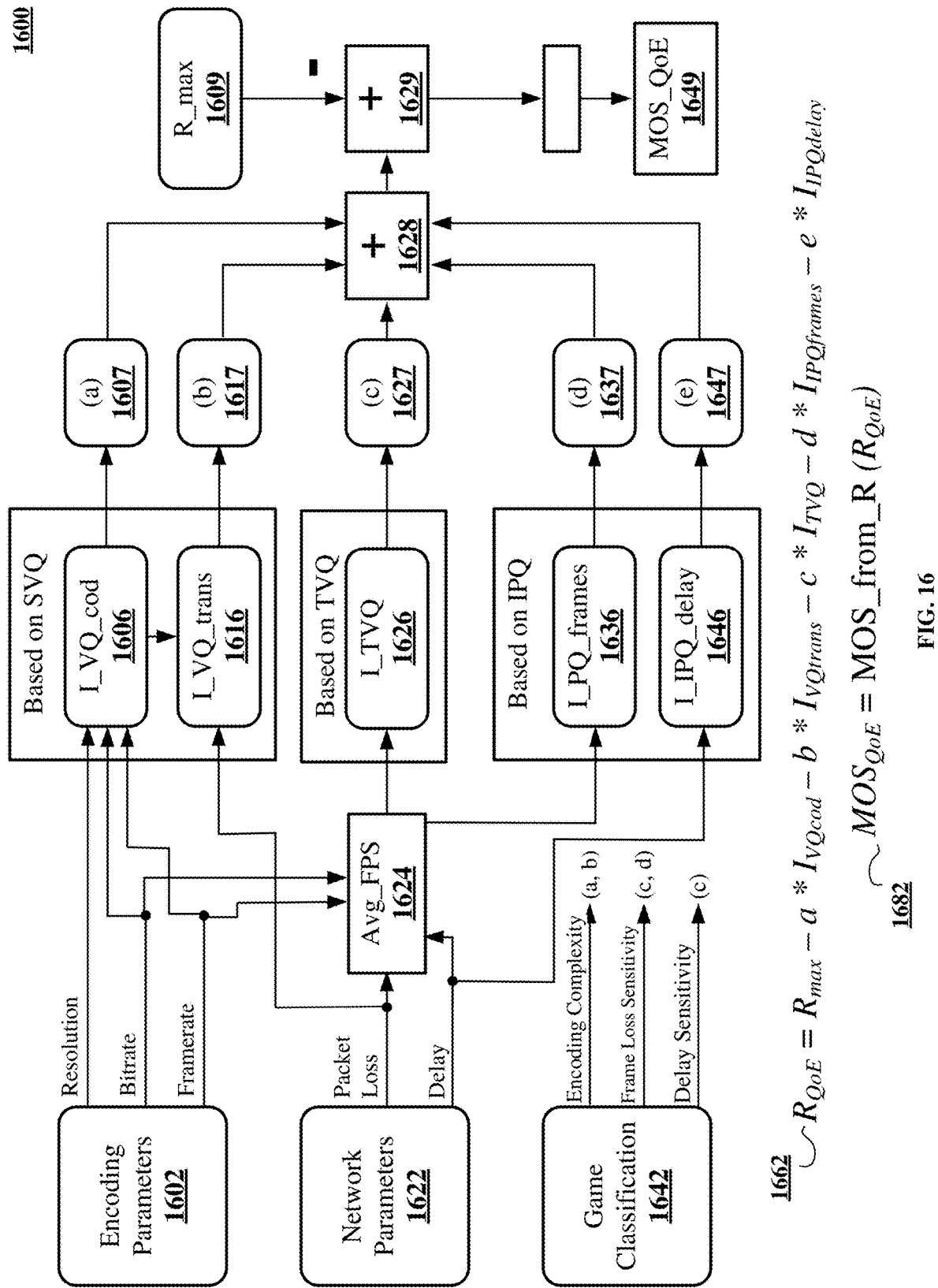

FIG. 16 is a schematic diagram of a model for evaluating cloud gaming performance consistent with ITU-T Rec. G. 1072.

Figure 17:
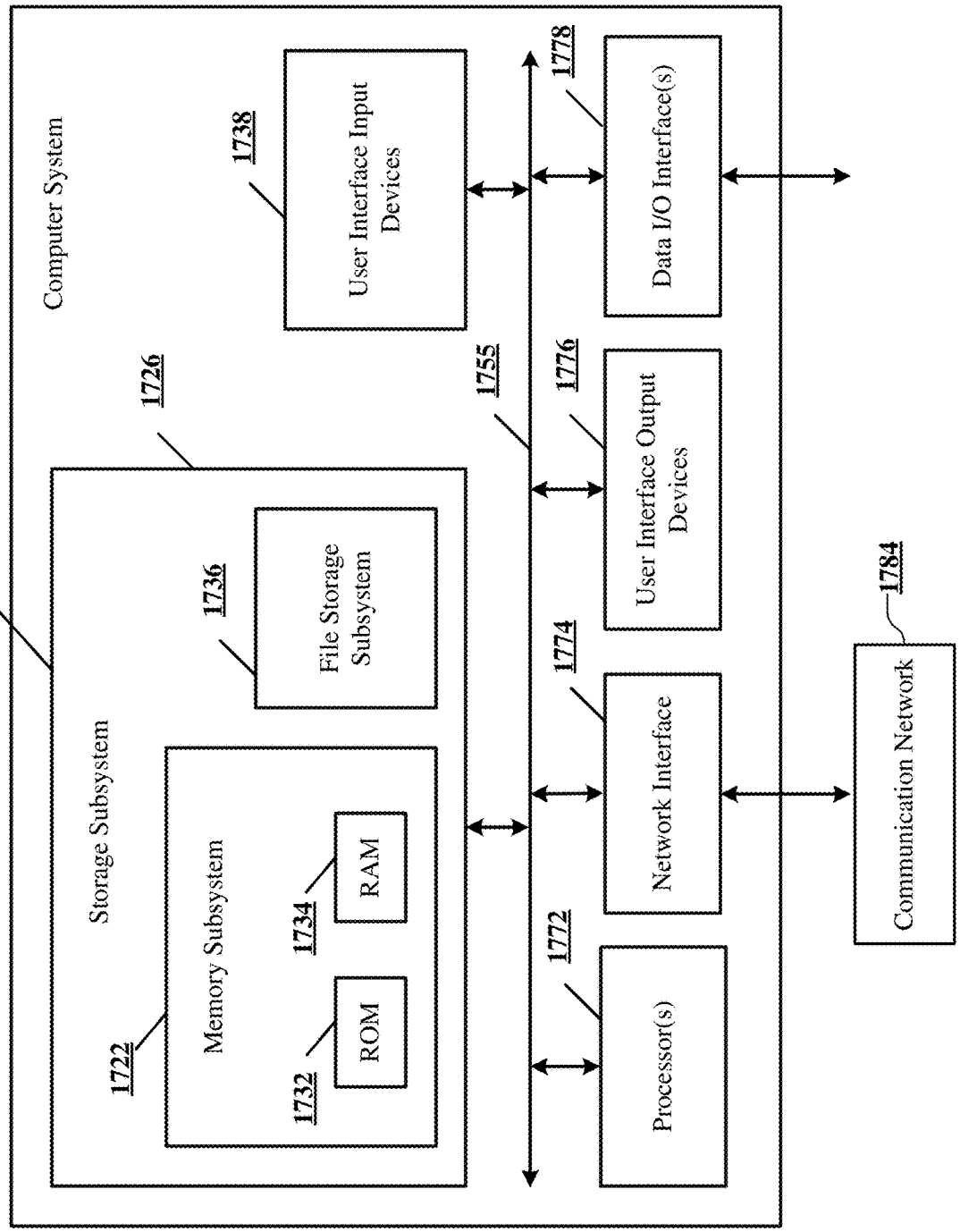

FIG. 17 is a simplified block diagram of a computer system that can be utilized for evaluating streaming video delivery quality over a network from a particular video source under varying network conditions, according to one implementation of the technology disclosed.

FURTHER DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Introduction

Cloud gaming with a 30 to 60 frames per second update rate on high resolution mobile devices requires low latency and reliable packet delivery. Reliable packet delivery depends on raw network performance, as latency requirements favor use of variations on user datagram protocol (UDP) instead of an acknowledgment and retry protocol, such as transmission control protocol (TCP). The rollout of 5G cellular networks has enabled cloud action gaming on handhelds.

Gaming is different than video replay due to the impact on gameplay of user input events including user button presses, sweeping gestures and other input. The images displayed evolve frame-by-frame in response to user input, so the image buffer typically is one image deep. Numerous user commands are immediately relayed to the cloud server in individual packets without buffering to reduce response time and perceived latency. System response times are measured in milliseconds, not seconds.

In contrast to video replay, frequent user input events impact the available bandwidth for both computing on the handheld device and two-way cellular data communications. Significant innovations and improvements on testing methods were required to test cloud gaming over cellular networks.

Cellular network segments and configurations, both physical and logical, impact gaming performance. Network loading also impacts performance, as the cellular network allocates bandwidth to connected devices. The technology disclosed provides a method, device and computer readable media (CRM) for consistently measuring cellular network gaming performance.

Handheld devices have varying capabilities for running cloud games in browsers. Testing and evaluating browser-based cloud gaming capabilities of handheld devices is an object of this disclosure. Recommendation "Opinion model predicting gaming quality of experience for cloud gaming services", ITU-T G.1072, was approved in January 2020 and updated in October 2020 for standardizing how to calculate an overall performance score for cloud gaming from collected data. The manner of collecting data is not and would not be expected to be specified in the standard.

These inventors extended Spirent's Umetrix™ testing platform for measuring and analyzing user experience of video, data, and voice on any device, operating system, or network to apply to cloud gaming performance evaluation. Substantial innovations and adaptations were needed to accomplish mobile cellular gameplay testing on location and even while the mobile device is moving in a bus, car, train, etc. Testing on and measuring performance of a live network is one use of the evolved technology. Lab testing of new or modified hardware is a potential additional use of this technology, but not the primary use. Unreliable transport protocols (UDP, QUIC/UDP, and WebRTC) are the subject of testing, not TCP. Device buffers are expected, in the evolved test platform, to be very shallow, even just one or two frames. Test platform delivered images and simulated gaming are substituted for the prior platform's measurement of performance of live commercial services. Test segments of images are substituted for impairment of a live network. Cellular is emphasized over connections to wireless access points. In short, most of the test conditions have changed from those disclosed in U.S. patent application Ser. No. 16/842,676.

One innovation is development of a gameplay testing app that runs on the mobile device. The app causes the browser to connect to a cloud gaming simulator test platform and to generate simulated user input gameplay packets. The app is lightweight, so its operation does not significantly impact the overall demand on handheld device computing resources. Applicant's team determined that the user input events could be generated without dependence on details of the gameplay images, because the objective is to test the cellular network and/or the handheld device, rather than the back-end gaming simulation server.

Another innovation is development of a segmented test of gameplay alternative scenarios. For instance, in one test sequence, 15 one-minute segments have differing frame rates, video download bandwidth, degrees of image complexity, and degrees of gameplay complexity. These sequences are downloaded while simulated user events with corresponding gameplay complexity are uploaded. Performance of a handheld device in each of the segments is calculated. Actual sequences of gaming images are used to produce images at a resolution suitable for the handheld device screen, such as 1920×1080. Higher resolutions can be used for larger devices, such as tablets, or to test high resolution mobile phones. New browser-connected instrumentation, new test stimulus, and new user gameplay simulation capabilities are among the innovative extensions of prior testing frameworks.

Yet another innovation involves applying artificial intelligence (AI) classifier-based MOS (mean opinion score) scoring to the gameplay image video test segments without access to reference video during production use of the classifier. The resulting scores can be used to improve implementation of the G.1072 recommendation. Applicant's team adapted a previously patented AI-MOS video classifier to scoring of gameplay video. This required as training data, segments of pristine video image sequences from gameplay at varying frame rates and image complexity. The pristine video images were systematically degraded, optionally including simulation of frame freeze conditions. Sequences of paired pristine and degraded images were used to train the classifier to generate scores for video segments. The scores were scaled for use in a recommendation-compliant G.1072 overall evaluation scorer. The G.1072 model, as well as scaling of scores on an R-scale and the values listed within Table 1, shown below, are elaborated upon more within FIG. 21. In one implementation, the scaled AI-MOS score was substituted for the video quality impairment factor variable I_VQ_cod in the core model formula (1) of Recommendation ITU-T G.1072, listed below. An improved method of implementing the technical Recommendation for a cloud gaming opinion score evaluation resulted.

The core model formula (1) for predicting gaming quality of experience of Recommendation ITU-T G.1072, along with the $MOS_{QoE}$ calculation formula (2) are:

$$R_{QoE}=R_{max}-a*I_{VQ_{cod}}-b*I_{VQ_{trans}}-c*I_{TVQ}-d*I_{IPQ_{frames}}-e*I_{IPQ_{delay}} \quad (1)$$

$$MOS_{QoE}=MOS\_from_R(R_{QoE}) \quad (2)$$

A summary of the variables within equations (1) and (2) is provided below in Table 1.

| | |
|---|---|
| R_QoE | Overall estimated gaming quality of experience (QoE) expressed on the R-scale, where 0 is the worst quality and 100 is the best quality |
| MOS_QoE | Overall estimated gaming QoE expressed on the MOS-scale, where 1 is the worst quality and 5 is the best quality |
| R_max | Reference value indicating the best possible gaming QoE (=100) on the R-scale |
| I_VQ_cod | Estimated spatial video quality (VQ) impairment for video compression artifacts on the R-scale (i.e., the video quality impairment factor) |

-continued

| | |
|---|---|
| I_VQ_trans | Estimated spatial video quality impairment for video transmission errors on the R-scale |
| I_TVQ | Estimated temporal video quality (TVQ) impairment for frame rate reductions on the R-scale |
| I_IPQ_frames | Estimated input quality impairment (IPQ) for frame rate reductions on the R-scale |
| I_IPQ_delay | Estimated input quality impairment (IPQ) for network delay degradations on the R-scale |

Device manufacturers benefit from an objective way to evaluate cloud gaming performance of their devices on live or simulated networks. The segments of a test can be selected to effectively stress test performance of a new or updated device.

Network operators who deliver cloud gaming over mobile and broadband networks benefit from an objective way to evaluate delivered cloud gaming quality even though they do not own the games and therefore cannot directly measure the video quality, but only gather network statistics. The technology disclosed provides a repeatable test of performance across cells in a cellular network.

Gaming-service providers such as Shadow™, GeForce Now™, Vortex™, Project xCloud™ and PlayStation Now™ also can benefit from evaluation of the quality of the game play delivery, even though they do not own the network infrastructure. Full-reference video quality analysis (FR VQA) techniques, which could be used to compare received video to full quality reference gaming video frames are much more difficult to apply to gaming than for streaming video, because the delivered video depends on user game play input. The FR VQA approach cannot practically be applied to evaluate live game play, because testers do not have access to the pristine original images, in part because the image sequences evolve responsive to user input during gameplay.

Builders of cloud gaming services and video devices can benefit from an objective way to evaluate video quality during development of new services and devices. In one example, a developer can receive and evaluate gaming image video using beta versions of their firmware and then be able to change their display driver firmware and retest.

The technology disclosed builds on prior work by this team, which developed a non-reference video quality analyzer (NR VQA). The prior work described how an image classifier could be trained using pairs of full reference video frames and synthetically impaired video frames, scored by a full reference video quality analyzer, to generate ground truth for training a NR VQA classifier. The trained classifier can produce quality scores from video frames captured from browsers on mobile gaming devices, without access to reference video.

The technology disclosed for cloud gaming performance testing can be used to improve on the ITU-T G.1072 standard. A scaled result of MOS scoring can be substituted for the I_VQ_cod parameter of core model equation (1). Data can be collected from the gaming device regarding packet loss, jitter and one-way latencies down and up-stream for use in equation (1). The technology disclosed can produce subjective scoring model that uses both measured and selected parameters to determine a QoE MOS score.

The measured and selected quantities during a test segment can include measured (i) Packet loss (0-5%) and (ii) Delay (0-400 ms). The selected quantities can be (i) Bitrate (0.3 to 50 Mbps), (ii) Framerate (10 to 60 fps), (iii) Resolution (7680×4320, 3840×2160, 1920×1080, 1280×720, 640×480), (iv) Video Complexity (High, Medium, Low) and (v) Interactivity Complexity (High, Medium, Low). While discrete values are given for the selected quantities, the reader should understand that this disclosure covers categorical ratings replaced with continuous scores, subranges within the specified ranges, and resolutions between the highest and lowest resolution identified. In time, as higher resolutions such as 16 k come into use, the technology disclosed can be extended to higher resolutions.

Various scoring models can produce MOS key performance indicators (KPIs), including (i) Overall QoE: (1-5), (ii) Delay QoE (1-5), (iii) Packet loss QoE (1-5) and (iv) Video QoE (1-5). While the range is specified as 1-5, another range such as 1-10 or 1-100 or categorical labels such as high medium and low are also disclosed.

NR VQA Described

This section of technology description, about the non-reference video quality assessment, NR VQA, is adapted to cloud gaming from priority application Ser. No. 16/216,699, which is incorporated by reference.

Humans do not need an A-B comparison to determine how good something looks. We recognize blockiness, blurriness and choppy motion as the impairments that they are. Using a kind of artificial intelligence known as machine learning technology, systems are able to automatically recognize these artifacts by evaluating the displayed video, and then scoring the video with a metric that correlates tightly to human perceptual scores. A learning algorithm is typically tested for impaired videos relative to ground truth scores from subjective testing with humans. A neural-network-based learning system can be trained to score videos, using a large training set, as machine learning models improve, in terms of prediction precision, as the training data set size increases.

NR algorithms could be trained on subjectively scored video samples and scores, but this approach is limited by the short supply of subjectively scored video and the cost of collecting subjective scores in large quantities. It is both expensive and time consuming to collect subjective scores even in small quantities. For example, fifty college students can be tasked to rate hundreds to thousands of images, which will yield only 5,000 to 50,000 data points.

The disclosed technology enables video testers to determine the quality of transmitted video, scoring video quality on a 1 to 5 video mean opinion score (VMOS) scale, without needing to compare the video to a pristine full reference video. Our technology enables training a NR VQA classifier or neural network on videos and video scores generated by accepted and standardized full reference video quality (FR VQA) algorithms. FR VQA algorithms take pairs of pristine video and received video to generate MOS scores without the need for human scoring. Again, the FR VQA algorithms rely on having pristine video available for comparison. Herein, we describe a system and methods that leverage FR VQA algorithms to create a ground truth set containing received video (i.e., impaired video) and corresponding MOS scores, so that a non-reference classifier can be trained to predict video scores without the use of pristine video for reference. The disclosed technology overcomes both the cost and time constraints by automating the generation of the training data in the form of artificially impaired videos, the generation of FR VQA scores for degraded images in training pairs, and the production of the models that are used by the NR VQA classifier to score videos. An ensemble of models, such as SVMs, can be trained for different image resolutions, image complexity, and/or gameplay complexity, etc., if preferred. A system for evaluating streaming video delivery quality over a network is described next.

FIG. 1 depicts example architecture 100 for generating NR training data using full reference (FR) video and FR video mean opinion score (VMOS), at a variety of frame rates, image resolutions and delivery bandwidths for game images with varying image complexity. Image sequence segments are used for generating synthetically impaired videos using filters tuned to generate impairments that approximate the reference FR VMOS video and score. Video artifacts can be introduced at many points along the video distribution and reproduction chain: at video capture, during encoding, while traversing the network, and during decoding and display. An assumption is made that the more similar a set of game video training images are to the type of images presented to mobile devices to be performance tested, the more precisely the results will predict subjective scores for similar cloud gaming test images. In some implementations, the training can be performed using families of similar training images, such as training separately for high complexity gaming content and low complexity gaming. Pristine video 122 includes a set of pristine game play images of the highest quality available according to subjective analysis by relative experts in the video field, chosen such that their quality is greater than or equal to the intended use for the subsequently created score generator. For example, to create a score generator for analyzing highly compressed 1920×1080 resolution videos, pristine video 122 includes lightly compressed or uncompressed video of equal resolution to 1920×1080, and subjective VMOS of 5.0 or nearly 5.0, to establish an absolute reference point for ground truth generator 144, which provides relative image quality scores.

Pristine video 122 is input to training set generator 124 that produces a training dataset that contains a large number, such as tens or hundreds of thousands, of calibrated impaired video sample clip pairs, generated from the pristine full reference video, and stores the video sample clips in training examples 136. Training set generator 124 transcodes pristine video with various quality-affecting settings such as quantization parameter, constant rate factor and the application of various image filters. The resulting videos exhibit one or more impairments and various degrees of impairments. The types and degrees of impairments determine the ability of the resulting score generator to accurately detect the same. Types and degrees of impairment can be varied independently of each other and can be mixed and matched. Rather than a training set with a few key types of artifact samples spread across a few select types of scenes, training set generator 124 covers a vast array of artifact samples, with each type of artifact and each degree of distortion being represented in segments of gameplay sequences. Example impaired video sample clips include coding and compression artifacts and network distribution artifacts. A modest training data set can be used when the test segments represent known gaming sequences or a handful (e.g., 4 to 20) of known games. The inventors determined that a handful of games is sufficient to represent varying complexities when measuring performance of a cellular network or mobile device. Tens or hundreds of thousands of images can be sufficient for training a SVM to evaluate gaming images from a handful of games. More examples, millions of examples can be used for training if available, but with diminishing impact on accuracy of the model. We describe further details of types of impairments and the resulting analysis opportunities below.

Continuing the description of architecture 100, ground truth generator 144 utilizes pristine video 122, receives the calibrated impaired video sample clips from training set generator 124, generates associated video quality scores for each video sample clip, and stores each video sample clip with its respective score in training examples 136. That is, ground truth generator 144 is a FR VQA system used together with pristine FR video and synthetically impaired videos to produce very large amounts of scored training data.

Further description of types of video impairments and the resulting analysis opportunities are offered.

Compression and coding artifacts typically arise from insufficient bandwidth allocation during the encoding process. Most modern codecs use a form of block-based lossy compression to reduce data size. Video frames are divided into blocks of pixels of various sizes and then each block is encoded separately. The result of this process is that there can be image discontinuities along pixel block boundaries. These blocky edges may be quite noticeable and may have a large effect on video quality perception.

Training set generator 124 synthesizes blockiness artifacts by over-compressing training videos. There are three ways that we can do this. In each case we start with a pristine video. In the first case we use the CRF (constant rate factor) option in our transcoding process. CRF is a setting that will cause the encoder to attempt to maintain a specified level of quality regardless of the number of bit that must be allocated to do so. CRF values range from 0 to 51 where 0 is the highest level of quality and 51 is the lowest. For example, if we transcode a pristine video with all attributes remaining the same as the original but with a CRF value of 25, we can create an impaired video with reduced quality that is consistent frame to frame throughout the video. If we then score this video using ground truth generator 144, a FR VQA system, we see consistent VMOS scores frame to frame. By transcoding the pristine video using all possible CRF values training set generator 124 offers a family of impaired videos with a full range of compression impairments.

In the second case we use the QP (quantization parameter) option in our transcoding process. QP is a setting that will cause the encoder to remove high frequency DCT (discrete cosine transformation) coefficients that are smaller than the specified QP value from the resulting compressed video data. The effect of doing this is that fine image details smaller than the specified QP setting will be lost. The higher the QP value, the more detail that is lost and the smaller the resulting video data size. Visually, the loss of detail is equivalent to blurry edges. QP values range, on one scale, from 1 to 31 where 1 is the lowest quality setting and 31 is the highest. The technology disclosed will work with QP values on virtually any scale chosen. Unlike CRF, the QP option does not produce a uniform quality level from frame to frame. Instead, it is used to reduce the size of the video data by removing a certain level of detail from the entire video. For example, if we transcode a pristine video with all attributes remaining the same as the original but with a QP value of 15, we can create an impaired video with reduced quality that has roughly the same level of detail from frame to frame throughout the video. If we then score this video using a FR VQA method, we would expect to see different VMOS scores frame to frame depending on how much detail a frame originally contained. By transcoding the pristine video using all possible QP values training set generator 124 provides a family of impaired videos with a full range of compression impairments.

In a third case we use the B (bitrate) option in our transcoding process. B is a setting that will cause the encoder to maintain a fairly constant bitrate that can be configured to not exceed a maximum bitrate. The net effect of doing this is that frames with a high amount of detail will be more highly compressed than frames with a low amount of detail. Those that are more highly compressed will be more impaired. Visually, the higher the level of compression the more we would expect to see both blocky edges as well as the loss of fine details. The bitrate may be set to correspond to the target distribution system for our model. For example, if we wish to train a model that can be used to score gaming image video sequences distributed over a 30 Mbps network channel, we may choose our transcoding bitrate to be 30 Mbps or less. We start with a pristine video that has a higher bitrate than our target bitrate and transcode it with a variety of bitrates such that it fit the cellular network distribution bitrates. If we then score these videos using ground truth generator 144 we see VMOS scores that generally increase as the bitrate increases.

Distribution system artifacts that we consider are those arising from the loss of video data as it is transmitted to an end-point, in one implementation. In a gaming image video delivery system, loss of data could results in one of two impairments. Either the video will freeze on the last successfully received frame or it could display the absence of a frame (which may involve displaying some indicator that it is waiting for the next frame).

A video freeze can be synthesized simply by transcoding a pristine video but with a frame repeat option used on one or more segments of the video. When ground truth generator 144 scores the resulting video, repeated frames without variation in distortion can produce the same VMOS score as the first repeated frame in the series or show a reduced VMOS score for repeated frames to reflect the fact that it is impaired, depending on the implementation. When the same frame is repeated by the gamer's browser, with the same sequence number in the frame border or metadata, the dropped packet/frame counter is invoked. The dropped frame can be accounted for by network data measurement, rather than video quality measurement, especially when a repeated frame has pristine quality. Otherwise, it could be difficult to distinguish a moment of looking at the game scene from a dropped and repeated frame.

A black frame or stalled video impairment or repeated could be synthesized by splicing black, nearly black, or stall indication video segments into an otherwise pristine video during the transcoding process. A stall indication video segment example is the black frame with spinning progress wheel sometimes seen during on-demand video streaming when re-buffering occurs. A repeated frame is just that. When ground truth generator 144 scores the resulting video it will either produce a high VMOS score indicating that the screen is black and not impaired, or it will interpret the repeated black frames as impairment and score those frames as a low VMOS score, dependent on the use case and implementation.

In both examples of stalled video delivery, additional information could be used when evaluating multiple successive frames to determine if packet delivery was impaired or if the video sequence contained legitimate segments with little or no motion. For NR model training, successive pristine video frames can be interpreted as having a VMOS of 5 and it is up to the network data monitoring component to determine if the distribution system has been impaired. The test system can sequentially number frames in the image border, metadata or both. The browser-connected app or another instrumentation component can observe image sequences and report dropped frames. Dropped packet statistics observed from repeated sequence numbers in rendered image frames can be input into the G.1072 model equations.

Applying filters to segments of pristine videos at a variety of frame rate, resolutions, bandwidths and image complexity and scoring the resulting videos with a FR VQA ground truth generator 144, rather than subjective human scoring, makes the disclosed technology for gaming image evaluation unique.

With pristine video 122 and impaired versions of those videos with known types and degrees of impairments as training examples 136, ground truth generator 144 utilizes input pristine and impaired pairs of the same video in a FR VQA process, which produces a DMOS (differential video mean opinion score) for each pair. Since the reference videos were chosen to be the highest level of quality, the resulting DMOS scores can be taken as absolute scores, not merely differential scores. This can be used to calculate the absolute VMOS scores of the impaired videos.

With FR absolute VMOS scores and with the associated impaired videos we can now use these pairs to train our NR VQA classifier 156. We start by computing feature scores for a designated set of video characteristics for each impaired video and then associate those feature scores to the FR absolute VMOS score for each impaired video. Then, we use the features scores and the VMOS score as a support vector to use in SVM (support vector machine) training. The complete set of support vectors used (i.e., the complete set of impaired videos, video feature scores, and absolute VMOS scores) are then used to build a hyperplane regressor which represents NR VQA score model 166. That is, these scored training examples 136 are the training set inputs for training NR VQA classifier 156, which can be implemented as a support vector machine (SVM), utilizing the resultant dataset of training examples 136 and generating VQA scores that correlate closely with a FR VQA system. An SVM trained model improves in accuracy and effectivity as the number of data points increases. One implementation of this architecture utilizes a cloud computation platform capable of processing thousands, if not millions, of iterations (such as Amazon EC2) which can process the number of videos and produce the number of support vectors required to create accurate video scores within a reasonable number of hours or days. Selected segments of gaming images from a handful of games, as opposed to representative samples of the wide range commercial video streaming content, present a controllable degree of test complexity. Other classifiers can also be used.

Training pairs of example videos and scores, without reference to a corresponding pristine video, can also be used to train a SVM or a neural network model such as a multi-layer convolutional neural network (CNN), an atrous CNN (ACNN), or hybrid LSTM/CNN network in some implementations. Each frame or just a sampling of frames can be used, as the VQA depends more on the quality of individual frame than time dependent relationship among frames. Implementations for specific use cases can combine the use of data for the specific video environments to be tested, and can emphasize detection of a variety of artifacts, including compression and scaling.

The trained NR VQA classifier 156 input for NR VQA score model 166 is not dependent on full reference video. In one implementation, NR VQA score model 166 is implemented based on a variation of Blind/Referenceless Image Spatial Quality Evaluator (BRISQUE) no-reference video quality assessment, a state-of-the-art natural scene assessment tool developed at the University of Texas at Austin's Laboratory for Image and Video Engineering (LIVE). BRISQUE has become one of the most-used quality assessment tools in broadcast and content production environments.

FIG. 2 depicts example test architecture 200 for performing NR VQA on test gaming image video sequences, for which access to pristine full reference video is not available for comparison. Video decoder and display engine 212 can capture and decode gaming image videos selected to be served by the gaming test server from many sources: augmented reality and virtual reality (AR/VR) display 222, smart TV 232, mobile endpoint 242, set top box 252, gaming platform 262 and tablet 272 as test video 244. Examples of augmented reality experiences include Snapchat lenses and the game Pokemon Go™. Virtual reality (VR) implies a complete immersion experience that shuts out the physical world. Video decoder and display engine 212 can also capture and decode gaming video from additional video sources not explicitly named here. Captured test video 244 gets scored using NR VQA score model 166 which has been previously generated as described relative to architecture 100. NR VQA score model 166 process begins by computing features scores for a designated set of video characteristics for each test video and uses the results of training with a very large NR data set with hundreds of thousands of samples, as described previously, to determine what NR VMOS value to associate with those feature scores. The result is an absolute NR VMOS for each test video and captured NR VMOS scores during testing, which can be stored in video and NR scores database 246 and utilized for performance evaluation either automatically or by an operator via a performance analysis interface 266.

Comparison to a well-known metric shows over 90% correlation between the intended score and results obtained using the disclosed technology. The open-source Video Multi-method Assessment Fusion (VMAF) metric developed by Netflix and the University of Southern California, is a well-known metric that is one of the best in the industry. The VMAF video scoring system combines human perceptual vision modeling with artificial intelligence to produce a 1-to-100 scale quality score, or a score on a different scale such as 0-1. Note that VMAF relies on a pristine reference video for comparison. VMAF has been shown to be superior to many other algorithms in terms of its ability to produce a score that is well correlated to how people rate video quality.

In another implementation, the disclosed non-reference NR VMOS model can be trained to model a different VMOS model, such as perceptual evaluation of video quality (PEVQ) from Opticom, instead of VMAF. This PEVQ metric uses metrics such as peak signal-to-noise ratio (PSNR) and structural similarity index (SSIM). The disclosed technology produces video sequence NR VMOS scores for the video sequences that can satisfy a predetermined correlation with standards-based FR VMOS scores.

We use a four-step process to determine how well the disclosed technology compares to the full-reference VMAF metric. First, we create a score baseline data set containing several thousand video clips, beginning with source videos that contain a wide variety of scene types that vary in image complexity, color and other attributes. Each clip is encoded multiple times at varying levels of compression to produce a large data set containing the types of video anomalies that are produced by compression encoding. As the degree of compression increases the encoder typically ignores fine details and uses larger block sizes, causing blurriness and blockiness in the rendered video, as described supra. Next, we generate a VMAF score for every clip in the data set by passing the data set through the VMAF full-reference algorithm for scoring videos, to obtain a baseline dataset of video clips with VMAF scores for a wide variety of scene types and compression levels. The baseline dataset also contains the reference video associated with each of the encoded clips. In the third step we run the encoded clips in the baseline dataset through the disclosed NR VQA score generator to produce a video quality score for each, which at this stage, like VMAF, is producing a 1 to 100 score. Unlike VMAF, of course, the disclosed technology only "sees" the compressed clip, not the reference video. As the last step, we observe the correlation between the intended score (VMAF's score) and the score generated using the disclosed technology, for each of the thousand compressed clips in the baseline dataset.

FIG. 3 shows a Spearman correlation graph of true VMAF score 324 and predicted VMAF score 322 obtained using the disclosed technology for training machine learning models on streaming video using the prior technology to produce no-reference NR VMOS scoring. Spearman's rank correlation uses statistics to assess how well the relationship between two variables can be described using a monotonic function. The disclosed technology achieves a Spearman correlation of more than 90% with the VMAF score across the entire baseline dataset. Similar results have been produced with much smaller training data sets for gaming image video sequences.

The disclosed non-reference NR VMOS model offers a very good method of scoring video content without employing a reference for comparison. Using the attributes of the underlying BRISQUE machine learning quality assessment tool, the disclosed technology produces excellent gaming image video quality scores across a variety of scene types and compression levels. FIG. 4 builds on the example architecture of FIG. 1, using a trained NR VQA to score video from gaming video image sources, such as Stadia™.

Google Stadia™ is a cloud gaming service that can run on Google Chrome™ or Chromecast™ and depends on WebRTC to deliver peer-to-peer (P2P) voice, video, and data communication through browsers via an API. A user may interact with Google Stadia™ to purchase or select a particular video game and initiate that video game, at which point the browser begins a WebRTC video session. During a WebRTC video session, a cloud gaming server transmits both video and audio, while the gaming user transmits inputs (e.g., using a gamepad, mouse and keyboard, smartphone touch screen interface, and so on). Accordingly, the video stream and input stream have different traffic loads for each game. For example, the first-person game depicted within FIG. 8 or the role-playing game depicted within FIG. 9 may require high-volume traffic for both the video stream and the input stream. In contrast, the simulation game within FIG. 10 may have a highly-variable traffic load for the input stream with a low-to-moderate traffic load for the video stream. Furthermore, a puzzle game such as a crossword puzzle or Sudoku puzzle has a slower playstyle that will correspond to lower traffic loads for the video stream and the input stream.

The video stream may be adjusted in response to parameters such as resolution and video codec. The technology disclosed is applicable for videos with resolutions including, but not limited to, 1280×720 (i.e., 720p), 1920×1080 (i.e., 1080p), or 3840×2160 (i.e., 2160p or 4K). During a cloud gaming session, resolution may change mid-stream in response to the network state. In contrast, video encoding (e.g., H.264, VP8, or VP9) is kept constant throughout a cloud gaming session. WebRTC uses a combination of at least some of the following protocols: Interactive Connectivity Establishment (ICE) protocol (which facilitates P2P capabilities in UDP media sessions via Network Address Translator (NAT)), Session Traversal Utilities for NAT (STUN), Traversal Using Relay NAT (TURN), Datagram Transport Layer Security (DTLS) (used to provide security in datagram-based communications), and Real-Time Protocol (RTP) and/or Real-Time Control Protocol (RTCP). Within some implementations of the technology disclosed, the listed protocols, within WebRTC or any other cloud gaming session, may either (i) provide metrics to be used within the cloud gaming performance testing such as packet loss or jitter, (ii) be used as input parameters during configuration or initialization of the disclosed system for cloud gaming performance testing, or (iii) a combination of both.

The technology disclosed may also be used alongside other gaming video image sources, such as PlayStation Now™, Microsoft XCloud™, NVIDIA GeForce Now™, and so on. A user skilled in the art will recognize that these cloud gaming services are listed purely as examples and the technology disclosed may be used alongside any service configured to support cloud gaming and/or streaming video gaming content on demand.

FIG. 4 depicts example architecture 400 for evaluating game play image video delivery quality over a network from a particular video source under varying network conditions, which builds on the architecture 100 of FIG. 1. Components of the Non-Reference Video Scoring System 135 that are used to generate the NR VQA Score Model 166 have the same reference numbers as in FIG. 1. For this part of FIG. 4, refer to the description of FIG. 1. Some implementations of the technology disclosed may include an impaired network video generator 405. Impaired network video generator 405 includes a network policy and impairment generator 404, which processes streaming video sources 402 (i.e., a segmented gaming video image stream) and generates processed video of varying quality 406, as well as network metrics 418 via network metrics collector 416. The captured video 408 (i.e., the impaired segmented video image stream; see above description with regards to video impairment and artifacts) is received by device receiving video 407 from impaired network video generator 405.

Architecture 400 supports analysis of streaming game image segment delivery from a test server.

Technology such as disclosed in U.S. Pat. No. 9,591,300 B2 can electronically capture rendered video via a high-definition multimedia interface (HDMI) by wired connection or wireless casting. Two examples of wired HDMI interfaces are mobile high-definition link (MHL) and SlimPort, an interface based on the Mobility DisplayPort standard. An example of a wireless HDMI interface is Miracast, a peer-to-peer wireless screen casting standard. Miracast can operate by forming a direct Wi-Fi Direct connection with a dongle mounted in an HDMI port of a display. The disclosed technology also includes capturing rendered video via other technology that implements the HDMI specification, which specifies multiple modes of uncompressed digital video out (often called "clean HDMI"). Cabled HDMI is preferred to wireless HDMI to eliminate noise introduced by communication with the mobile device video under test (DUT), which cannot readily be separated from the reproduction being tested. Other measures can be taken to control RF channel conditions. Electronic capture technology does not depend on projection or capture lenses, avoiding projective transformation and lens distortion that occur in the analog domain when optically capturing the appearance of an LCD or LED screen. For example, lens distortion causes squares to appear slightly spherical with a wide-angle lens effect. These lens distortions are not present in HDMI captured images, without projection or capture lenses.

In an alternative, analog implementation, a camera can be used to optically capture the appearance of the LCD or LED screen. This can produce lens distortion. A video with a known checkerboard pattern would be captured and analyzed to compensate and to calculate a correction for the lens distortion from the test pattern. In both implementations, video frames are captured.

From control messages optionally combined with video capture, the system can directly measure stalls, buffering and startup time. Network statistics can be enough to infer the stalls, buffering and startup time. Video capture can be used to confirm inferred statistics or to refine inferences as to correlation of network traffic and video display. The captured video frames and network metrics are correlated, for instance by time stamps.

The captured video can be scored by NR VQA score model 166 or an alternative image scorer. The NR VQA does not need access to pristine video to generate a score for video received over an impaired or bandwidth limited channel. Sets of correlated network metrics and video quality scores are combined as an impaired network (IN) VQA ground truth training set 409.

In practice, training examples 409 are likely to be captured across device and source pairings. These training examples can be annotated with device and source. They also can be annotated with video genre. Training examples may form sets for particular videos, with examples from multiple scenes in a particular video. Given typical scene lengths in entertainment video, as opposed to training video, sample frames can be separated by a predetermined minimum time difference; alternatively, in other implementations, a scene detector could be applied to trigger network statistic and video frame retention or to select captured data for the training set. Samples from different scenes of an entertainment video are useful, because video service codecs can be tuned to change encoding between scenes, adapted to how the scene is changing from frame-to-frame. For the sake of clarity, components that assemble video capture and network metrics into a training set are not included in FIG. 4.

Once a training set 409 has been assembled, the data is used can be used for training a classifier, such as presenting support vectors to train a support vector machine (SVM) training. A support vector can include any or all of network metrics identified above. The SVM is trained to produce video quality metrics that match ground truth video quality scores in the training set.

Applying system architecture 400, with either a NR VQA score model 166 or another scorer, a complete set of captured video frames, automatically calculated VMOS scores and the network metrics 418 are automatically synchronously collected and correlated, for use building a hyperplane regressor which represents the disclosed impaired network model. The training set inputs are used for training NR VQA classifier 468, which can be implemented as an SVM. (Alternatively, a deep learning classifier can be trained, one using either a CNN or RNN.) That is, the complete set of training vectors can be used as support vectors to build a hyperplane regressor that is represented in FIG. 4 as NR VQA score model 478. The more tightly constrained the training samples are, the more precise the results models will be in predicting scores for similarly constrained videos.

An SVM trained model improves in accuracy and effectiveness as the number of data points supporting the hyperplane regressor increases. For cloud gaming test segments, the training task and number of data points required to reach a predetermined confidence or error distribution level is modest. In one implementation, three games are used to produce fifteen test segments introduced by segment headers, as described below.

FIG. 5 depicts example architecture 500 for collecting supplemental impaired video from a gaming simulation test server over a live network. A network metrics collector 516, akin to 416, could collect network statistics. At a basic level, this would include statistics for packet traffic. The metrics collected can include, in some implementations, codec identifiers and codec parameters from the gaming simulation test server, as it adapts to cellular network conditions. Similarly, data collected during tests could be processed to generate training sample pairs, based on collected frame numbers, and produce an extended training data set for NR VQA.

A network operator could use collected evaluation data regarding user experiences to control bandwidth allocated to video delivery, equitably assuring that users with various user devices 502 or service plans obtain similar gaming experience across gaming service providers. User devices 502 may comprise iPhone display engine 212, Android display engine 214, AR/VR Display 222, Smart TV 232, mobile endpoint 242, set top box 252, Gaming Platform 262, and/or Tablet 272. Gaming service providers can compare the quality of the service that they deliver to other carriers and evaluate the efficiency of their codecs. New compression algorithms can be benchmarked. Bandwidth can be allocated. Many uses can be made of good data regarding user gaming quality experience on live networks.

Data collected during testing can be provided to Score Model 478 to produce a database of scores 546 that are available to the network monitoring results 566 in some implementations of the technology disclosed.

FIG. 6 illustrates potential operation of the impairment generator 404 during creation of supplemental training data. The blue line indicates manipulation of available bandwidth. It begins at 5 Mb, drops to 3 Mb, rises to 4 Mb, rises to 5 Mb then drops to 2 Mb, etc. The impairment generator 404 can control available bandwidth on the network in this pattern or some other selected pattern. The user device and app will make requests for video at specific bitrates and receive averaged bitrates indicated by the orange line collected by the Network Metrics Collector 416. The resulting quality measured as a mean option score using the NR VQA is indicated by the green line captured by captured video 408 (i.e., captured segmented gaming video stream) and Scored by the NR VQA Score Model 166. In reality the values are not as steady (flat) as they are shown here for illustration. The data illustrated here could be used in a training process to improve the NR VQA Score Model 478.

FIG. 7 reports the predicted quality levels across providers, as generated by Score Model 478 and displayed via network monitoring results 566. The predicted quality levels can be a combination of MOS or video resolution. The Social Media B provider 726 has the highest bit rate for low quality. Accordingly, content by users on smartphones and uploaded for sharing involves rapidly changing scenes with complex video encoding. Provider News 765 has the lowest overall bit rates among providers for comparable bit rates, as the content is captured in a studio under controlled conditions with high quality equipment and is easier to encode. In reality, the various levels of bitrate and quality are numerous, and it is to be understood that the results represented within FIG. 7 are not to be considered limiting.

Cloud Gaming Performance Testing

Most cloud gaming video players choose to freeze the frame when there is packet loss that affects that frame. This is how the Chrome™ browser by Google presently handles bad frames during cloud gaming. Other players could render the frame with visible packet loss errors (slicing effects). The technology disclosed can simulate a player that freezes packet loss affected frames. It also could be trained to browsers that insert black or blocky frames.

Video Complexity is a composite quantity that reflects the sensitivity of game images to changes in resolution, framerate, and bitrate. First person games with realistic graphics are rated HIGH (e.g., Battlefield™). Third person and role-playing games are often rated MEDIUM (e.g., World of Warcraft™). Turn based or simulation games are often rated LOW (e.g., Minecraft™).

Interactivity Complexity is a composite quantity that reflects the sensitivity of game inputs and outputs to packet loss and delay. Often, games that are sensitive to video parameters are also sensitive to packet loss and delay. Network latency can make the game feel sluggish and can give players who do not experience delays an inherent advantage. Similarly, packet loss leading to frozen frames makes the game feel jerky. Players who do not experience packet loss can see game changes sooner and therefore can react sooner.

FIG. 8 is an example of a first-person game with realistic graphics that are rated as having HIGH video complexity. The image re-produced within FIG. 8 is a frame from Battlefield™, a game within the shooter genre that is often played in first-person mode. First-person shooter and games with multi-player online modes, such as Battlefield™, are often characterized by features such as numerous campaigns that are visually and strategically unique, large maps within the game for players to explore, fast-paced user interaction that emphasizes speed and precision, a broad range of possible user inputs, and a correspondingly broad range of resulting scenarios in response to inputs from one or more users in a short span of time. These features, particularly when considered cumulatively, require a high degree of video complexity and video performance for quality of gaming experience. For example, in a battle campaign within the shooter genre of video games, video impairment such as frame freezes that are one second or less or even two to ten, 20 or 30 frames in duration may result in substantial consequences for the user's in-game performance. Thus, cloud gaming network performance and video quality are particularly important for in-game quality of experience within games that are rated as having HIGH video complexity.

FIG. 9 is an example of a role-playing game with graphics that are rated as having MEDIUM video complexity. The image re-produced within FIG. 9 is a frame from World of Warcraft™, a game within the massively multi-player online/role-playing game (MMORPG) genre that is often played in online environments with a high volume of players engaging in complex interaction to influence gameplay. MMORPGs such as World of Warcraft™ typically will have less-detailed graphics compared to counterpart games that are designed to equip fewer simultaneous players. MMORPG games regularly accommodate over one hundred players simultaneously In contrast to MMORPGs, other online RPGs such as the "co-op" modes within Dragon Age™ and Dark Souls™ limit the number of players who are able to interactively play a game together with a limit of approximately two dozen at most and typically, less than ten players at a time. The smaller quantity of players corresponds to a limited and fixed number of player models, well-defined maps (e.g., zones or levels), and a more-easily managed volume of user input to process and generate gameplay output responses at one time. Hence, it is less computationally expensive for a non-MMORPG gaming server to provide a higher video complexity.

World of Warcraft™, as shown in the captured image within FIG. 9, often averages over one million players per day and hundreds of thousands of players simultaneously at any given moment. To accommodate this volume of players simultaneously, the maps must be extremely large and dynamically responsive to allow for thousands of gameplay events to occur and thousands of user inputs at any given second. Moreover, each user is able to influence the graphics not only through interaction with other game objects (e.g., other players, monsters and villains, or environmental objects like building structures and resources) but also through expansive player customization options that are a key feature in player quality of experience. Rendering of video graphics for players within an MMORPG is often not feasibly possible without requiring prohibitively high-end hardware specifications. Thus, MMORPG games that are offered to a broad audience and accessible via common methods, such as a smart phone using a cellular network, very typically will be rated as having MEDIUM video complexity. Games with MEDIUM video complexity have the same need to test and evaluate issues with cloud gaming performance and video quality that higher complexity games do, but they cannot be evaluated equivalently for video quality given the inherent differences in features associated with different levels of complexity.

FIG. 10 is an example of a simulation game with graphics that are rated as having LOW video complexity. The image re-produced within FIG. 10 is a frame from Minecraft™, a game within the sandbox genre of video games that can be played online within multi-player servers. To some extent, the block-based style of Minecraft™ is an aesthetic choice that has become a defining commercial feature of many sandbox games. However, the low-quality block graphics provide a key functional advantage within this genre of gaming that goes beyond aesthetic preferences and brand recognition. Sandbox games allow users to build new objects and influence gameplay by taking a role as a creator themselves. Intuitively, the popularity of a sandbox game is often tied to the creative freedom given to players as they influence gameplay with their creations and the variety of environments within which a user may create. Minecraft™, for example, boasts a nearly infinite game world wherein the game features are initially seeded to some extent, but gameplay is substantially influenced following initialization by the players' choices during creation of new features, objects, and non-playable characters to interact with. One factor that enables the breadth and depth of sandboxes like Minecraft™ is the literal "building block" structure of the game. When graphical objects within the game are constructed of the same simplistic block structure, it takes very little customization to generate different objects and increases the number of objects that can be generated exponentially. Sandbox games are a popular genre, particularly within younger demographics and within the "microgaming" (i.e., cell phone gaming) field. Much like the above comparison of MEDIUM video complexity games and HIGH video complexity games, LOW video complexity games still benefit equally from cloud gaming performance testing. A classifier employed for cloud gaming performance is trained on separate gaming image segments from a lower-complexity game due to the inherent differences in appropriate scoring of video qualities.

Requirements of Gaming Video Simulation Testing

FIG. 11 illustrates a cloud gaming test wherein a HIGH video complexity game is displayed containing black bands at the top and bottom of the video with various corresponding metadata. FIG. 11 will be described within the context of evaluating gameplay video on a small screen 1100, like a mobile device, although the description below also applies to MEDIUM and LOW video complexity games.

Model. Provide a NR Cloud Gaming Small Screen scoring model trained to detect encoding and scaling impairments in CGI video. The model can be trained on actual game play video from HIGH, MEDIUM, and LOW encoding complexity videos. In a Umetrix™ implementation, the Video Scoring Settings GUI panel can provide the Cloud Gaming Small Screen scoring model as a selectable scoring model.

Videos. One implementation of gaming video test segments is described in this section. Three types of videos can be supported in Cloud Gaming tests: HIGH (High Encoding Complexity/High Delay Sensitivity), MEDIUM (Medium Encoding Complexity/Medium Delay Sensitivity), LOW (Low Encoding Complexity/Low Delay Sensitivity). Each type of video can have 5 bitrates: 10, 20, 30, 40, and 50 Mbps encoded with H.264. Therefore, 15 distinct videos. In most implementations, all videos can be 1920×1080 resolution or 4K resolution. HIGH videos can have 60 fps frame rate. MEDIUM and LOW videos can have 30 fps frame rate. In most implementations, all videos can contain black bands at the top and bottom of the video such that the image part of the frame 1102 has dimensions as 1920×800. Therefore, each black band can be 1920×140. In most implementations, all videos can be created from high quality actual game play source videos. There can be five source videos per video type. In most implementations, all videos can contain text-based metadata information displayed in the black bands at the top of the image in 5 equal size horizontal sections. The metadata contains: frame number 1121, width 1122, height 1123, frame rate 1124, bitrate (in kbps) 1125, and video ID (as a number) 1126. This disclosure focuses on two aspects to Cloud game testing: downloaded gaming images and uploaded user inputs. Cloud game testing is implemented by the technology disclosed. Both are simulations of the elements of real cloud gaming. The technology disclosed provides a repeatable test methodology that can be used to compare cellular network segments or areas and to compare mobile devices on which games are played. The first element is segments of cloud gaming image videos. In some implementations, cloud-gaming image videos can be tested using Spirent's UMETRIX™ analytics, which was not previously equipped to process cloud-gaming video data. The second element is a simulation of cloud gaming data flows to measure latency and loss and is also defined below. Together, these elements can provide a test of cloud gaming performance over a cellular network. Of course, different test parameters and ranges of test parameters can be used with a gaming simulation test server and browser-connected test component.

Gaming Video Simulation Testing

Cloud gaming video is typically transmitted over UDP, QUIC/UDP, or WebRTC. This is different than on-demand video because cloud gaming is inherently live CGI. There is very little time to retransmit a frame that does not arrive before the following frame. In other words, buffering time is constrained to one frame display duration at a given frame rate. The use of QUIC to provide some level of reliability is helpful but not mandatory. The technology disclosed could be used test video over UDP, QUIC/UDP, or WebRTC. Data rates can be consistent with the video bitrates empirically seen in Stadia™ testing.

A Umetrix™ or other test controller can be used to orchestrate testing. A series of video segments with specific encoded properties can be streamed and played in Chrome on Android devices. In this way, the technology disclosed can control the duration of each video segment as devices are tested in chosen geographic locations or cells of a cellular network or, potentially, in a lab. Multiple devices can be testing using the same gaming segments in roughly the same geographic locations. In some implementations, testing can be performed at a plurality of locations via a driving test, during which the DUT is transported to a plurality of locations on the live network (e.g., 100 to 1,000,000 physical locations). The segments of the segmented gaming video image stream, and corresponding captured images, can be further correlated with data identifying a user of the DUT and/or a device type of the DUT. The technology disclosed can sample packet delivery information while the video is playing. In one implementation, a plurality of simultaneous downlinks and uplinks to simulate interactive gameplay action on the DUT during cloud gaming over a live cellular network. An analyzer device can test one-way latency for small packets uplinked from the browser to the gaming simulation test server. After the cloud gaming test completes, the associated RF information can be retrieved from a database and corresponding KPIs can be reported, optionally according to the geographic locations of captured frames. The cellular packet delay information can be used as inputs to the G.1072 models.

FIG. 12 is a schematic diagram of streaming video from a live or simulated cloud gaming session during a cloud gaming test using a wired connection to obtain images from the game player, in accordance with one implementation of the technology disclosed. Cloud gaming data 1221 is transmitted to a small screen medium, such as Google Chrome™ operating on a mobile device 1223, via live or simulated cellular network 1222. Mobile device 1223 is connected to an image collection device 1224, such as a UMETRIX™ hub or other test controller, via a wired connection (i.e., HDMI) to transmit the video data. A test controller, i.e., hub 1224, is used to invoke a browser (e.g., Google Chrome™) and instrument app on mobile device 1223 to connect to a gaming simulation over network 1222. Hub and image collection device 1224 is connected to an analyzer such as computing device 1225 to perform analysis on the recorded cloud gaming video.

FIG. 13 is a schematic diagram of a cloud gaming test using a wireless connection to obtain test data, within accordance of one implementation of the technology disclosed. As shown in FIG. 13, Cloud gaming data 1321 is transmitted to a small screen medium, such as Google Chrome™ operating on a mobile device 1323, via live or simulated cellular network 1322. In contrast, FIG. 13 represents an alternative implementation wherein images are wirelessly cast from mobile device 1323 to another device that analyzes the cloud gaming video data.

FIG. 14 is a message flow diagram 1400 representing a cloud gaming test, in accordance with one implementation of the technology disclosed. FIG. 14 comprises components cloud/edge device 1402 (e.g., devices that transmit cloud gaming data 1221 and 1321), network 1404 (e.g., networks 1222 and 1322), client device 1406 (e.g., devices 1223 and 1323), data and image collection hubs 1448 and 1486 (e.g., hub 1224) and a cloud gaming performance evaluation 1488 (e.g., evaluation being performed on a device such as computing device 1225). Cloud/edge device 1402 houses a mobile gaming platform 1422, further comprising video streamer 1442, emulated video packets 1462, and emulated command interpreter 1482. Video streamer 1442 transmits video frames 1444 to a video decoder 1446 operating within a browser 1426 housed on the client device 1406 via network 1404. The video decoder 1446 transmits decoded video frames 1447 to the image collection device and hub 1448, such as a UMETRIX™ hub in some implementations. Hub 1448 computes performance metrics 1449 for the video frames 1447, which are then transmitted for cloud gaming performance evaluation 1488. In some implementations, the video frame evaluation can be coupled with network data evaluation as well. In these implementations, an emulated command interpreter 1482 sends video frames one-way latency 1484 to hub 1486, which sends user input one-way latency 1494 back to the emulated command interpreter 1482. Hub 1486 analyzes this data like packet loss and jitter 1496 to produce performance metrics 1449, which are also sent for cloud gaming performance evaluation 1488. In one implementation, a plurality of simultaneous downlinks and uplinks to simulate interactive gameplay action on the DUT during cloud gaming over a live cellular network. An analyzer device can test one-way latency for small packets uplinked from the browser to the gaming simulation test server.

FIG. 15 is a schematic illustrating an example graphical user interface (GUI) 1500 for a cloud gaming test, in accordance with one implementation of the technology disclosed. The illustrated GUI shows MOS scores for a sequence of frames on two separate channels, Channel A and Channel B. A plurality of additional metrics may be displayed towards a user, such as indicating the occurrence of freezing or buffering events within a particular interval. In addition to the metrics displayed within the GUI 1500, a broad plurality of metrics (described in detail throughout the description) as well as further post-processing analytics (e.g., summary statistics or correlations) may be exported via a report file (e.g., Excel file (*.xls, *.xlsx), comma separated values (*.csv), tab separated values (*.tsv), XML data (*.xml), text file (*.txt), PDF (*pdf), and so on) for further review.

Testing. Video segments tested in a drive quadrant for a carrier can be part of a single test session. Test video segments contain multiple video clips as well as segment header screens. There can be 5 or one to 20 or more iterations of variations on the following pattern:

a. Segment header screen (small number of frames);
    b. HIGH video @ 10 Mbps @ 60 fps (1 minute);
    c. Segment header screen (small number of frames);
    d. HIGH video @ 20 Mbps @ 60 fps (1 minute);
    e. Segment header screen (small number of frames);
    f. HIGH video @ 30 Mbps @ 60 fps (1 minute);
    g. Segment header screen (small number of frames);
    h. HIGH video @ 40 Mbps @ 60 fps (1 minute);
    i. Segment header screen (small number of frames);
    j. HIGH video @ 50 Mbps @ 60 fps (1 minute);
    k. Segment header screen (small number of frames);
    l. MEDIUM video @ 10 Mbps @ 30 fps (1 minute);
    m. Segment header screen (small number of frames);
    n. MEDIUM video @ 20 Mbps @ 30 fps (1 minute);
    o. Segment header screen (small number of frames);
    p. MEDIUM video @ 30 Mbps @ 30 fps (1 minute);
    q. Segment header screen (small number of frames);
    r. MEDIUM video @ 40 Mbps @ 30 fps (1 minute);
    s. Segment header screen (small number of frames);

t. MEDIUM video @ 50 Mbps @ 30 fps (1 minute);
u. Segment header screen (small number of frames);
v. LOW video @ 10 Mbps @ 30 fps (1 minute);
w. Segment header screen (small number of frames);
x. LOW video @ 20 Mbps @ 30 fps (1 minute);
y. Segment header screen (small number of frames);
z. LOW video @ 30 Mbps @ 30 fps (1 minute);
aa. Segment header screen (small number of frames);
bb. LOW video @ 40 Mbps @ 30 fps (1 minute);
cc. Segment header screen (small number of frames); and
dd. LOW video @ 50 Mbps @ 30 fps (1 minute).

Of course, other patterns could alternatively be used. The video capture session can be parsed into individual video segments according to the video ID metadata found at the top of the frame. Videos that have the same video ID can be grouped together and scored together on the Video Scorecard tab. The Frame Number metadata can be extracted and displayed in the Raw Data tab and displayed as Absolute Frame Number. Other metadata can be for visual inspection only and cannot be extracted from images at this time. Individual columns in the Video Scorecard can be named according to the video ID. A JSON file can be associated with Cloud Gaming Video Tests which associates video IDs with other metadata including resolution, bitrate, and framerate. The resolution, bitrate, and framerate for each video ID can be displayed on the Video Scorecard along with the video ID. Video of the Umetrix™ Data screens cannot be scored. The MOS scoring ROI can be set on the image part of the video frames excluding the black bands.

KPIs. KPIs for a video stress test can be computed for a cloud gaming video test. This includes setting and using thresholds that determine whether video buffers, freezes, fails to start, exits before starting, or fails to finish. Additional KPIs can be computed from network performance measures stored in a database, such as a Umetrix™ Data database. These KPIs can be obtained from the database via APIs. The KPIs can be correlated according to the GPS coordinates recorded during data collection and reported together. These KPIs contain network performance obtained from the UE during the test.

Data Simulation Testing

Cloud gaming video can be transmitted over UDP, QUIC/UDP, or WebRTC. This is different than on-demand TCP-transmitted video. Cloud gaming video is inherently live. There is very little time to retransmit a frame that does not arrive on time (before the following frame arrives). In other words, buffering opportunity is constrained to the time it takes to display one frame. The use of QUIC to provide some level of reliability can be used by several cloud gaming companies. WebRTC is used by others. The technology disclosed can simulate video that is transmitted over any of these protocols or similar protocols that may adopted in the future by sending data packets at rates that are consistent with various video bitrates empirically observed with Google Stadia™. These bitrates can match those of the Cloud Gaming Video Tests. The technology disclosed can simultaneously perform downstream and upstream data tests with data rates that are consistent with those empirically observed with Google Stadia™.

The Cloud Gaming Data Test set can be orchestrated by a Umetrix™ data test component developed for gameplay testing. Both video and data are typically served downstream by a gaming server or gaming test server. One-way upstream and downstream data tests can be conducted in parallel on the same device. Data in the downstream direction can be transmitted at a pre-determined velocity such as 1, 2, 4 or 8 Mbps, in one implementation. In another implementation, downstream data can be transmitted at velocities that match those of the Cloud Gaming Video Tests. Nominally those velocities can be, for example, 10, 20, 30, 40, and/or 50 Mbps. Ranges bounded by any pair of these discrete values also are disclosed. Each downstream direction data test can last for the same duration as the Cloud Gaming Video Tests. Nominally this can be 1-minute durations. Upstream data can be transmitted at 1 Mbps or another rate, but 1 Mbps generally supports user generated input. Nominally test segments can be 1-minute durations. The network performance monitoring component can sample and collect packet delivery information while the data tests are running. A user skilled in the art will recognize that these velocities are given as examples and may comprise other values not listed within or reasonably close to the ranges and values provided.

FIG. 16 is a schematic diagram of a model for evaluating cloud gaming performance consistent with ITU-T Rec. G.1072. Model 1600 processes input parameters including encoding parameters 1602, network parameters 1622, and game classification 1642. Encoding parameters 1602 include resolution, bit rate, and framerate. Network parameters 1622 include packet loss and delay. Game classification 1642 include encoding complexity, frame loss sensitivity, and delay sensitivity. Encoding parameters 1602 including resolution, bit rate, and frame rate are processed to produce the video quality impairment factor value I_VQ_cod 1606. I_VQ_cod 1606, along with packet loss, are processed to produce I_VQ_trans value 1616. Bit rate and frame rate, along with packet loss and delay, are processed to compute an Avg_FPS 1624. which can be further processed to obtain an I_TVQ value 1626 and I_PQ_frames value 1636. Delay can be further processed to produce an I_IPQ_delay value 1646. The video quality impairment factor, I_VQ_cod 1606, along with the encoding complexity are processed with a scalar value a 1607. I_VQ_trans 1616, along with encoding complexity, are processed with a scalar value b 1617. I_TVQ 1626, frame loss sensitivity, and delay sensitivity are processed with a scalar value c 1627. I_IPQ frames 1636, along with frame loss sensitivity, are processed with a scalar value d 1637. I_IPQ_delay 1646 is processed with a scalar value e 1647. The resulting scaled values are then summed together in function 1628 and subtracted from the R_max value 1609 in function 1629 to result in an R_QoE value. The R_QoE value can be used to determine an MOS_QoE score 1649. Accordingly, equation 1662 summarizes functions within model 1600 up until function 1629 to produce the R_QoE value and equation 1682 summarizes the relationship between the R_QoE value and MOS_QoE value 1649. Equation 1682 may be a variety of transformation functions that process the output value of function 1629 to produce MOS_QoE 1649. Equation 1662 corresponds to the previously discussed equation (1) and equation 1682 corresponds to the previously discussed equation (2), the variables of which discussed within FIG. 16 are defined above within Table 1.

The technology disclosed can produce an improved Gaming QoE score, building upon the G.1072 core model, using data from KPIs recorded during the downstream and upstream data tests. The technology disclosed can define a new type of test, sometimes called a UDP Cloud Gaming Test. This test type would include both a downstream and an upstream one-way UDP test running simultaneously. It can capture the downstream and upstream one-way latencies, which can be combined as a proxy for network roundtrip time. Packet loss in the downstream image data can be measured as a percentage of packets transmitted, for input into the G.1072 core model. The Cloud Gaming Data Test definition UI should support assigning values to these parameters.

System Configuration Options

Model. Use the G.1072 Cloud Gaming QoE algorithm reference code from GitHub. This code is a single Python script. It can be used to compute the QoE score for each 1-minute Cloud Gaming Data Test.

UI/Test Definition. There can be a new task type called UDS Single-stream SIM DUV that executes download (DL), upload (UL), and video image collection tasks simultaneously. The technology disclosed can include (i) the ability to define the test duration; (ii) the ability to define the DL data rate; (iii) the ability to define the UL data rate; (iv) the ability to define the Interactivity Sensitivity such as Low, Medium, and High) that can be used to compute the G.1072 KPIs, (v) the ability to define the Video Complexity (possible values are Low, Medium, and High) that can be used to compute the G.1072 KPIs; (vi) the ability to define the Coding Resolution (such as 3840×2160, 1920×1080, 1280×720, and 640×480) that can be used to compute the G.1072 KPIs; (vii) the ability to define the frame rate (such as 10 to 60) that can be used to compute the G.1072 KPIs; (viii) the ability to define to choose either freezing or slicing for the packet loss interpretation, that can be used to compute the G.1072 KPI; (ix) the ability to combine Interactivity Sensitivity and Video Complexity into a single concept called Complexity which can have possible values of Low, Medium, and High; (x) the ability to default the Coding Resolution as 1920×1080; (xi) the ability to limit the frame rate to possible values of 30 or 60; and (xii) the ability to hardcode the packet loss interpretation to be freezing.

Testing. In most implementations, the duration of all Cloud Gaming Data tests can be 60 seconds 3600 seconds or longer. In most implementations, all tests can have an upstream data rate of 1 Mbps. In most implementations, all tests can have a resolution setting of 1920×1080p or 4K. In most implementations, all tests can use the freezing interpretation of packet loss. In most implementations, all tests can use the same values for both Interactivity Sensitivity and Video Complexity (either high/high, medium/medium, or low/low).

There can be 15 total Cloud Gaming Data test segments. The G1073.py measured parameters can be used as follows: (i) --packetloss=<percentage of packets lost in the downstream direction>; and (ii) --delay=<individually or as a sum of the one-way latencies of upstream and downstream>.

The download rate and the other G1072.py parameter combinations for the 15 test segments can be: (i) DL rate=10, G1072.py --bitrate=10 --framerate=60 --coding_res=1920×1080 --Icomplexity=High --Vcomplexity=High; (ii) DL rate=20, G1072.py --bitrate=20 --framerate=60 --coding_res=1920×1080 --Icomplexity=High--Vcomplexity=High; (iii) DL rate=30, G1072.py --bitrate=30 --framerate=60 --coding_res=1920×1080 --Icomplexity=High --Vcomplexity=High; (iv) DL rate=40, G1072.py --bitrate=40 --framerate=60 --coding_res=1920×1080 --Icomplexity=High--Vcomplexity=High; (v) DL rate=50, G1072.py --bitrate=50 --framerate=60 --coding_res=1920×1080 --Icomplexity=High --Vcomplexity=High; (vi) DL rate=10, G1072.py --bitrate=10 --framerate=60 --coding_res=1920×1080 --Icomplexity=Medium--Vcomplexity=Medium; (vii) DL rate=20, G1072.py --bitrate=20 --framerate=60 --coding_res=1920×1080 --Icomplexity=Medium --Vcomplexity=Medium; (viii) DL rate=30, G1072.py --bitrate=30 --framerate=60 --coding_res=1920×1080 --Icomplexity=Medium--Vcomplexity=Medium; (ix) DL rate=40, G1072.py --bitrate=40 --framerate=60 --coding_res=1920×1080 --Icomplexity=Medium --Vcomplexity=Medium; (x) DL rate=50, G1072.py --bitrate=50 --framerate=60 --coding_res=1920×1080 --Icomplexity=Medium--Vcomplexity=Medium; (xi) DL rate=10, G1072.py --bitrate=10 --framerate=60 --coding_res=1920×1080 --Icomplexity=Low --Vcomplexity=Low; (xii) DL rate=20, G1072.py --bitrate=20 --framerate=60 --coding_res=1920×1080 --Icomplexity=Low--Vcomplexity=Low; (xiii) DL rate=30, G1072.py --bitrate=30 --framerate=60 --coding_res=1920×1080 --Icomplexity=Low --Vcomplexity=Low; (xiv) DL rate=40, G1072.py --bitrate=40 --framerate=60 --coding_res=1920×1080 --Icomplexity=Low--Vcomplexity=Low; and (xv) DL rate=50, G1072.py --bitrate=50 --framerate=60 --coding_res=1920×1080 --Icomplexity=Low --Vcomplexity=Low. All data test in a drive quadrant for a carrier can be part of a single test session. There can be 5, more or less, iterations of the 15 tests.

KPIs. Three of the KPIs can be computed by G1072.py and can be reported to include (i) Overall Quality, (ii) Interaction Quality (due to delay); and (iii) Interaction Quality (due to packet loss). In most implementations, some or all KPIs can be normally reported by UDP data download and upload tests can also be reported along with Android RF information.

Other Requirements. The Cloud Gaming Video Test, which includes browser-based gaming image video capture, can be run concurrently with the UDP download and UDP upload tests on the same device at the same time and at the same location.

If Cloud Gaming Video Test, UDP download, and UDP upload tests cannot be executed simultaneously on the same device at the same time and at the same location, then the UDP tests can be executed on a different devices but at the same time and at the same location.

Computer System

FIG. 17 is a simplified block diagram of a computer system 1700 that can be utilized for evaluating streaming video delivery quality over a network from a particular video source under varying network conditions, according to one implementation of the technology disclosed. Computer system 1700 is also usable for generating a no-reference video mean opinion score (NR VMOS) using a trained NR VMOS score generator.

Computer system 1700 includes at least one central processing unit (CPU) 1772 that communicates with a number of peripheral devices via bus subsystem 1755. These peripheral devices can include a storage subsystem 1710 including, for example, memory devices and a file storage subsystem 1736, user interface input devices 1738, user interface output devices 1776, and a network interface subsystem 1774. The input and output devices allow user interaction with computer system 1700. Network interface subsystem 1774 provides an interface to outside networks, including an interface to corresponding interface devices in other computer systems.

In one implementation, the training set generator, ground truth generator and NR VQA classifier of FIG. 1 can be communicably linked to the storage subsystem 1710 and the user interface input devices 1738 can be communicably linked to performance benchmark analysis interface of FIG. 2. User interface input devices 1738 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1700.

User interface output devices 1776 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1700 to the user or to another machine or computer system.

Storage subsystem 1726 stores programming and data constructs that provide the functionality of some or all of the modules and methods described herein.

Memory subsystem 1722 used in the storage subsystem 1726 can include a number of memories including a main random-access memory (RAM) 1732 for storage of instructions and data during program execution and a read only memory (ROM) 1734 in which fixed instructions are stored. A file storage subsystem 1736 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1736 in the storage subsystem 1710, or in other machines accessible by the processor.

Bus subsystem 1755 provides a mechanism for letting the various components and subsystems of computer system 1700 communicate with each other as intended. Although bus subsystem 1755 is shown schematically as a single bus, alternative implementations of the bus subsystem can use multiple busses.

Computer system 1700 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1700 depicted in FIG. 17 is intended only as a specific example for purposes of illustrating the preferred embodiments of the disclosed technology. Many other configurations of computer system 1700 are possible having more or less components than the computer system depicted in FIG. 17.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Some Particular Implementations

Some particular implementations and features are described in the following discussion. The implementations disclosed include all the statutory classes of articles of manufacture, methods and systems. As with most computer implemented inventions, computer instructions can be held by a computer readable media, which in this application is a non-transitory article of manufacture. The same instructions, when executed, implement a method. When instructions are combined with hardware, a device or apparatus results.

At least three uses of the technology disclosed are immediately recognized. First, a cloud gaming performance classifier can be trained that has multiple uses. Second, a trained cloud gaming performance classifier can be applied to monitor a live network. It can be extended by the network provider to customer relations management or to controlling video bandwidth. Third, a trained cloud gaming performance classifier can be used to infer bit rate switching of codecs used by video sources and content providers. Bit rate switching and resulting gaming quality scores can be used to balance network loads and to balance quality of experience for users, across gaming sources. Balancing based on bit rate switching and resulting gaming quality scores also can be used when resolving network contention.

Some implementations of the technology disclosed comprise a method of testing performance of a device-under-test (DUT) during cloud gaming over a live cellular network. The method comprises instrumenting the DUT with at least one instrument app that interacts with a browser on the DUT and captures performance metrics from gaming network traffic. The browser and instrument app are invoked using a test controller separated from the DUT, causing the browser to connect to a gaming simulation over the live cellular network. A segmented gaming image stream is transmitted to the browser with segments playing at varying bit rates and image complexity, while the instrument app causes the browser to transmit artificial gameplay events to the gaming simulation test server. Performance metrics are then captured from the gaming network traffic resulting from the segmented gaming image stream and artificial gameplay events during the segments, as well as capturing gaming images rendered by the browser during the segmented gaming image stream using the instrument app on the DUT and the analyzer on the gaming simulation test server's side of the live cellular network. In certain implementations, an aggregate performance evaluation is generated as output based on the captured gaming images and the captured performance metrics.

Various implementations of the method further comprise capturing performance metrics such as a video mean opinion score, a video quality metric, a latency, a downstream network loss for simulated video packets, and/or one or more quality of experience metrics. In one implementation, the aggregate performance evaluation can be substituted for the video quality impairment factor in the core model formula for gaming quality of experience of ITU-T Rec. G. 1072.

This architecture and other implementations of the technology disclosed can include one or more of the following features and/or features described in connection with additional architectures disclosed. In the interest of conciseness, the combinations of features disclosed in this application are not individually enumerated and are not repeated with each base set of features.

The gaming images rendered by the receiving device, such as a smart phone, can be accessed via an HDMI connection. Alternatively, they can be accessed via a wireless connection, such as a casting connection.

The captured gaming images can be scored using a non-reference video classifier that performs the scoring without dependence on access to a reference version, for quality comparison, of the captured gaming images. Non-reference video classifiers are described in the patent application incorporated by reference.

The method can further include selecting the video examples to include variety of scene types that vary in video complexity. Gaming examples of different genre, such as first-person shooter, sandbox, and MMORPG, present various kinds and degrees of coding complexity. Some examples present coding complexity that changes from scene to scene.

Video quality can depend on a combination of the segmented gaming image stream source and the receiving device, such as a type of smart phone. The method described can be applied to different brands and models and can use the smart phone brand and model as elements of the ground truth for the training.

The program instructions that can be included on an article of manufacture can, when executed on appropriate hardware, perform a computer-implemented method. The same instructions, when combined with hardware and the device, produce a computer implemented system.

Another implementation the technology disclosed is a computer readable media impressed with program instructions that, when executed on hardware, cause the hardware to perform a method of testing performance of a device-under-test (DUT) during cloud gaming over a live cellular network. The method comprises instrumenting the DUT with at least one instrument app that interacts with a browser on the DUT and captures performance metrics from gaming network traffic. The browser and instrument app are invoked using a test controller separated from the DUT, causing the browser to connect to a gaming simulation over the live cellular network. A segmented gaming image stream is transmitted to the browser with segments playing at varying bit rates and image complexity, while the instrument app causes the browser to transmit artificial gameplay events to the gaming simulation test server. Performance metrics are then captured from the gaming network traffic resulting from the segmented gaming image stream and artificial gameplay events during the segments, as well as capturing gaming images rendered by the browser during the segmented gaming image stream using the instrument app on the DUT and the analyzer on the gaming simulation test server's side of the live cellular network. In certain implementations, an aggregate performance evaluation is generated as output based on the captured gaming images and the captured performance metrics.

Various implementations of the method further comprise capturing performance metrics such as a video mean opinion score, a video quality metric, a latency, a downstream network loss for simulated video packets, and/or one or more quality of experience metrics. In one implementation, the aggregate performance evaluation can be substituted for the video quality impairment factor in the core model formula for gaming quality of experience of ITU-T Rec. G. 1072.

The program instructions that can be included on an article of manufacture can, when executed on appropriate hardware, perform a computer-implemented method. The same instructions, when combined with hardware and the device, produce a computer implemented system.

Yet another implementation includes a computer readable media impressed with program instructions that, when executed on hardware, cause the hardware to perform a method of testing performance of a device-under-test (DUT) during cloud gaming over a live cellular network. The method comprises instrumenting the DUT with at least one instrument app that interacts with a browser on the DUT and captures performance metrics from gaming network traffic. The browser and instrument app are invoked using a test controller separated from the DUT, causing the browser to connect to a gaming simulation over the live cellular network. A segmented gaming image stream is transmitted to the browser with segments playing at varying bit rates and image complexity, while the instrument app causes the browser to transmit artificial gameplay events to the gaming simulation test server. Performance metrics are then captured from the gaming network traffic resulting from the segmented gaming image stream and artificial gameplay events during the segments, as well as capturing gaming images rendered by the browser during the segmented gaming image stream using the instrument app on the DUT and the analyzer on the gaming simulation test server's side of the live cellular network. In certain implementations, an aggregate performance evaluation is generated as output based on the captured gaming images and the performance metrics.

Various implementations of the method further comprise capturing performance metrics such as a video mean opinion score, a video quality metric, a latency, a downstream network loss for simulated video packets, and/or one or more quality of experience metrics. In one implementation, the aggregate performance evaluation can be substituted for the video quality impairment factor in the core model formula for gaming quality of experience of ITU-T Rec. G. 1072.

Other implementations comprise leveraging a trained gaming quality classifier to the gaming network traffic resulting from the segmented gaming image stream and artificial gameplay events during the segments to assign performance metrics to the gaming network traffic resulting from the segmented gaming image stream and artificial gameplay events during the segments.

One implementation further comprises transmitting a plurality of simultaneous downlinks and uplinks to simulate interactive gameplay action on the DUT during cloud gaming over a live cellular network, wherein the analyzer tests one-way latency for small packets uplinked from the browser to the gaming simulation test server.

In another implementation, cloud gaming performance is mapped against network conditions for the gaming simulation over a live network, wherein tee mapping further comprises systematically impairing network conditions at a node of the live cellular network, capturing performance metrics from the gaming network traffic under the impaired network conditions, processing variation in the captured performance metrics during the systematic impairment of the network conditions, and saving a mapping of the cloud gaming performance against networking conditions including a correlation of the captured performance metrics with the impaired network conditions and a correlation of the captured gaming images with the impaired network conditions.

In one implementation of the technology disclosed, an improved method of evaluating cloud gaming performance of a DUT on a cellular network is used consistent with ITU-T Rec. G. 1072. The method includes using at least one instrument app running on the DUT, which interacts with a browser on the DUT, to connect the browser to a gaming simulation test server, to initiate a cloud gaming performance test, and to cause the browser to send artificial gameplay events to the gaming simulation test server during the cloud gaming performance test. Performance metrics are captured from gaming network traffic including images rendered by the browser during segments of the test conducted at varying bit rates and image complexity and captured images are supplied to a trained image classifier that generates artificial intelligence mean opinion score (AI-MOS) image quality scores for the segments. The image classifier has been trained at the varying bit rates and image complexity using pristine images from gaming scenes as ground truth data paired with synthetically impaired versions of the pristine images, trained to generate the AI-MOS scores for the synthetically impaired versions of the pristine images, and the AI-MOS image quality scores are used as input to an ITU-T Rec. G. 1072-based overall quality evaluation of results of the cloud gaming performance test. In one implementation, the AI-MOS image quality score can be substituted for the video quality impairment factor in the core model formula for gaming quality of experience of ITU-T Rec. G. 1072. In certain implementations, the AI-MOS scores are generated for the segments of the test without dependence on access to a reference version, for quality comparison, of the segments. The pristine images used in training can vary in video complexity and gaming genre.

The program instructions that can be included on an article of manufacture can, when executed on appropriate hardware, perform a computer-implemented method. The same instructions, when combined with hardware and the device, produce a computer implemented system.

The technology disclosed can be practiced as a system, method, or article of manufacture. One or more features of an implementation can be combined with the base implementation. Implementations that are not mutually exclusive are taught to be combinable. One or more features of an implementation can be combined with other implementations.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A method of testing performance of a device-under-test (DUT) during cloud gaming over a live cellular network, comprising:
   instrumenting the DUT with at least one instrument app that interacts with a browser on the DUT and captures performance metrics from gaming network traffic;
   invoking the browser and the instrument app using a test controller separated from the DUT, causing the browser to connect to a gaming simulation over the live cellular network;
   transmitting, to the browser, a segmented gaming image stream, segments playing at varying bit rates and image complexity, while the instrument app causes the browser to transmit artificial gameplay events to a gaming simulation test server; and
   capturing (i) performance metrics from the gaming network traffic resulting from the segmented gaming image stream and artificial gameplay events during the segments and (ii) gaming images rendered by the browser during the segmented gaming image stream using the instrument app on the DUT and an analyzer on the gaming simulation test server's side of the live cellular network.

2. The method of claim 1, further comprising outputting an aggregate performance evaluation based on the captured gaming images and the performance metrics.

3. The method of claim 2, wherein the captured performance metrics further comprise at least one of a video mean opinion score, a video quality metric, a latency, a downstream network loss for simulated video packets, and one or more quality of experience metrics.

4. The method of claim 2, wherein the aggregate performance evaluation is substituted for a video quality impairment factor in a core model formula for gaming quality of experience of ITU-T Rec. G. 1072.

5. The method of claim 4, wherein the capturing performance metrics further comprises leveraging a trained gaming quality classifier to the gaming network traffic resulting from the segmented gaming image stream and artificial gameplay events during the segments to assign performance metrics to the gaming network traffic resulting from the segmented gaming image stream and artificial gameplay events during the segments.

6. The method of claim 1, further comprising transmitting a plurality of simultaneous downlinks and uplinks to simulate interactive gameplay action on the DUT during cloud gaming over a live cellular network, wherein the analyzer tests one-way latency for small packets uplinked from the browser to the gaming simulation test server.

7. The method of claim 1, wherein the captured gaming images rendered by the browser are accessed by the analyzer via an HDMI connection.

8. The method of claim 1, further comprising mapping cloud gaming performance against network conditions for the gaming simulation over a live network, the mapping comprising:
   systematically impairing network conditions at a node of the live cellular network;
   capturing performance metrics from the gaming network traffic under the impaired network conditions;
   processing variation in the captured performance metrics during the systematic impairment of the network conditions;
   capturing the gaming images rendered by the browser during the systematic impairment of the network conditions; and
   saving a mapping of the cloud gaming performance against networking conditions including (i) a correlation of the captured performance metrics with the impaired network conditions and (ii) a correlation of the captured gaming images with the impaired network conditions.

9. An improved method of evaluating cloud gaming performance of a DUT on a cellular network, consistent with ITU-T Rec. G. 1072, including:
   using at least one instrument app running on the DUT, which interacts with a browser on the DUT, to connect the browser to a gaming simulation test server, to initiate a cloud gaming performance test, and to cause the browser to send artificial gameplay events to the gaming simulation test server during the cloud gaming performance test;
   capturing performance metrics from gaming network traffic including gaming images rendered by the browser during segments of the test conducted at varying bit rates and image complexity;
   supplying captured images to a trained image classifier that generates artificial intelligence mean opinion score (AI-MOS) image quality scores for the segments, wherein the image classifier has been trained at the varying bit rates and image complexity using pristine images from gaming scenes as ground truth data paired with synthetically impaired versions of the pristine images, trained to generate the AI-MOS image quality scores for the synthetically impaired versions of the pristine images; and using the AI-MOS image quality scores as input to an ITU-T Rec. G. 1072-based overall quality evaluation of results of the cloud gaming performance test.

10. The method of claim 9, wherein the AI-MOS image quality score is substituted for a video quality impairment factor in a core model formula for gaming quality of experience of ITU-T Rec. G. 1072.

11. The method of claim 9, further including generating AI-MOS scores for the segments of the cloud gaming performance test independent from access to a reference version, for quality comparison, of the segments.

12. The method of claim 9, wherein the pristine images using in training vary in video complexity and gaming genre.

13. The method of claim 9, wherein the cloud gaming performance test is performed on the DUT at plurality of locations via a driving test, and wherein the plurality of locations include 100 to 1,000,000 physical locations on the cellular network.

14. The method of claim 13, wherein the segments of the cloud gaming performance test at the plurality of locations on the cellular network are further correlated with data identifying a device type of the DUT and a user of the DUT.

15. A system configured to test performance of a device-under-test (DUT) during cloud gaming over a live cellular network, the system including a processor, memory coupled to the processor, and program instructions that, when executed on the processor, cause the processor to implement a method comprising:

instrumenting the DUT with at least one instrument app that interacts with a browser on the DUT and captures performance metrics from gaming network traffic;

invoking the browser and the instrument app using a test controller separated from the DUT, causing the browser to connect to a gaming simulation over the live cellular network;

transmitting, to the browser, a segmented gaming image stream, segments playing at varying bit rates and image complexity, while the instrument app causes the browser to transmit artificial gameplay events to a gaming simulation test server; and capturing (i) performance metrics from the gaming network traffic resulting from the segmented gaming image stream and artificial gameplay events during the segments and (ii) gaming images rendered by the browser during the segmented gaming image stream using the instrument app on the DUT and an analyzer on the gaming simulation test server's side of the live cellular network.

16. A tangible non-transitory computer-readable storage media, including program instructions loaded into memory that, when executed on processors, cause the processors to implement a method of testing performance of a device-under-test (DUT) during cloud gaming over a live cellular network, the method comprising:

instrumenting the DUT with at least one instrument app that interacts with a browser on the DUT and captures performance metrics from gaming network traffic;

invoking the browser and the instrument app using a test controller separated from the DUT, causing the browser to connect to a gaming simulation over the live cellular network;

transmitting, to the browser, a segmented gaming image stream, segments playing at varying bit rates and image complexity, while the instrument app causes the browser to transmit artificial gameplay events to a gaming simulation test server; and capturing (i) performance metrics from the gaming network traffic resulting from the segmented gaming image stream and artificial gameplay events during the segments and (ii) gaming images rendered by the browser during the segmented gaming image stream using the instrument app on the DUT and an analyzer on the gaming simulation test server's side of the live cellular network.

17. A system configured to evaluate cloud gaming performance of a DUT on a cellular network, consistent with ITU-T Rec. G. 1072, the system including a processor, memory coupled to the processor, and program instructions that, when executed on the processor, cause the processors to implement a method comprising:

using at least one instrument app running on the DUT, which interacts with a browser on the DUT, to connect the browser to a gaming simulation test server, to initiate a cloud gaming performance test, and to cause the browser to send artificial gameplay events to the gaming simulation test server during the cloud gaming performance test;

capturing performance metrics from gaming network traffic including gaming images rendered by the browser during segments of the test conducted at varying bit rates and image complexity;

supplying captured images to a trained image classifier that generates artificial intelligence mean opinion score (AI-MOS) image quality scores for the segments, wherein the image classifier has been trained at the varying bit rates and image complexity using pristine images from gaming scenes as ground truth data paired with synthetically impaired versions of the pristine images, trained to generate the AI-MOS image quality scores for the synthetically impaired versions of the pristine images; and using the AI-MOS image quality scores as input to an ITU-T Rec. G. 1072-based overall quality evaluation of results of the cloud gaming performance test.

18. A tangible non-transitory computer-readable storage media, including program instructions loaded into memory that, when executed on processors, cause the processors to implement an improved method of evaluating cloud gaming performance of a DUT on a cellular network, consistent with ITU-T Rec. G. 1072, the method comprising:

using at least one instrument app running on the DUT, which interacts with a browser on the DUT, to connect the browser to a gaming simulation test server, to initiate a cloud gaming performance test, and to cause the browser to send artificial gameplay events to the gaming simulation test server during the cloud gaming performance test;

capturing performance metrics from gaming network traffic including gaming images rendered by the browser during segments of the test conducted at varying bit rates and image complexity;

supplying captured images to a trained image classifier that generates artificial intelligence mean opinion score (AI-MOS) image quality scores for the segments, wherein the image classifier has been trained at the varying bit rates and image complexity using pristine images from gaming scenes as ground truth data paired with synthetically impaired versions of the pristine images, trained to generate the AI-MOS image quality scores for the synthetically impaired versions of the pristine images; and using the AI-MOS image quality scores as input to an ITU-T Rec. G. 1072-based overall quality evaluation of results of the cloud gaming performance test.

* * * * *